(12) United States Patent
Rihn et al.

(10) Patent No.: US 10,413,817 B2
(45) Date of Patent: Sep. 17, 2019

(54) METHOD AND APPARATUS FOR DETERMINING ENERGY AVAILABILITY FOR A HAPTIC-ENABLED DEVICE AND FOR CONSERVING ENERGY BY SELECTING BETWEEN A BRAKING AND NON-BRAKING MODE

(71) Applicant: Immersion Corporation, San Jose, CA (US)

(72) Inventors: William S. Rihn, San Jose, CA (US); Erin Ramsay, Nepean (CA)

(73) Assignee: IMMERSION CORPORATION, San Jose, CA (US)

( * ) Notice: Subject to any disclaimer, the term of this patent is extended or adjusted under 35 U.S.C. 154(b) by 171 days.

(21) Appl. No.: 15/429,382

(22) Filed: Feb. 10, 2017

(65) Prior Publication Data

US 2018/0229116 A1   Aug. 16, 2018

(51) Int. Cl.
*G06F 1/3234*   (2019.01)
*A63F 13/285*   (2014.01)
*G06F 3/01*   (2006.01)
*A63F 13/24*   (2014.01)
*G06F 1/3203*   (2019.01)

(52) U.S. Cl.
CPC ............ *A63F 13/285* (2014.09); *A63F 13/24* (2014.09); *G06F 3/016* (2013.01); *G06F 1/3203* (2013.01); *G06F 1/325* (2013.01)

(58) Field of Classification Search
CPC ........ A63F 13/285; A63F 13/24; G06F 3/016; G06F 1/3203; G06F 1/325
See application file for complete search history.

(56) References Cited

U.S. PATENT DOCUMENTS

| | | | |
|---|---|---|---|
| 9,781,542 B2* | 10/2017 | Rangarajan | H04W 52/0254 |
| 9,955,428 B1* | 4/2018 | Bacarella | H04W 52/0258 |
| 2010/0231550 A1* | 9/2010 | Cruz-Hernandez | G06F 3/016 345/174 |
| 2010/0309141 A1* | 12/2010 | Cruz-Hernandez | G06F 3/016 345/173 |

(Continued)

OTHER PUBLICATIONS

Extended Search Report dated Oct. 5, 2018 in corresponding European Patent Application No. 18 153 214.4.

*Primary Examiner* — Austin Hicks
(74) *Attorney, Agent, or Firm* — Medler Ferro Woodhouse & Mills PLLC

(57) ABSTRACT

A haptic-enabled device, comprising a haptic actuator, an energy storage device configured to provide energy to the haptic actuator, and a control unit communicatively coupled to the haptic actuator is presented. The control unit may be configured to determine an energy availability level for the haptic-enabled device. The determination is based on an energy level of the energy storage device or an energy usage rate thereof. The control unit may further be configured to determine an energy conservation setting for the haptic-enabled device based on at least one of (i) the energy availability level, and (ii) an input received by the haptic-enabled device for controlling the energy conservation setting. The control unit may be configured to determine, based on the energy conservation setting, whether to generate the haptic effect in a braking mode or in a non-braking mode.

21 Claims, 16 Drawing Sheets

(56) References Cited

U.S. PATENT DOCUMENTS

| | | | |
|---|---|---|---|
| 2011/0102162 A1* | 5/2011 | Gregorio | G06F 3/016 340/407.2 |
| 2014/0118126 A1 | 5/2014 | Garg et al. | |
| 2014/0247227 A1 | 9/2014 | Jiang et al. | |
| 2015/0241972 A1* | 8/2015 | Lacroix | G06F 3/014 345/156 |
| 2015/0301553 A1 | 10/2015 | Rossa et al. | |
| 2015/0362994 A1* | 12/2015 | Rihn | G06F 3/016 345/156 |
| 2016/0063826 A1 | 3/2016 | Morrell et al. | |
| 2016/0065712 A1* | 3/2016 | Zhekov | H04M 1/663 455/567 |
| 2016/0155305 A1 | 6/2016 | Barsilai et al. | |
| 2016/0339792 A1* | 11/2016 | Khoo | B60L 11/1825 |

\* cited by examiner

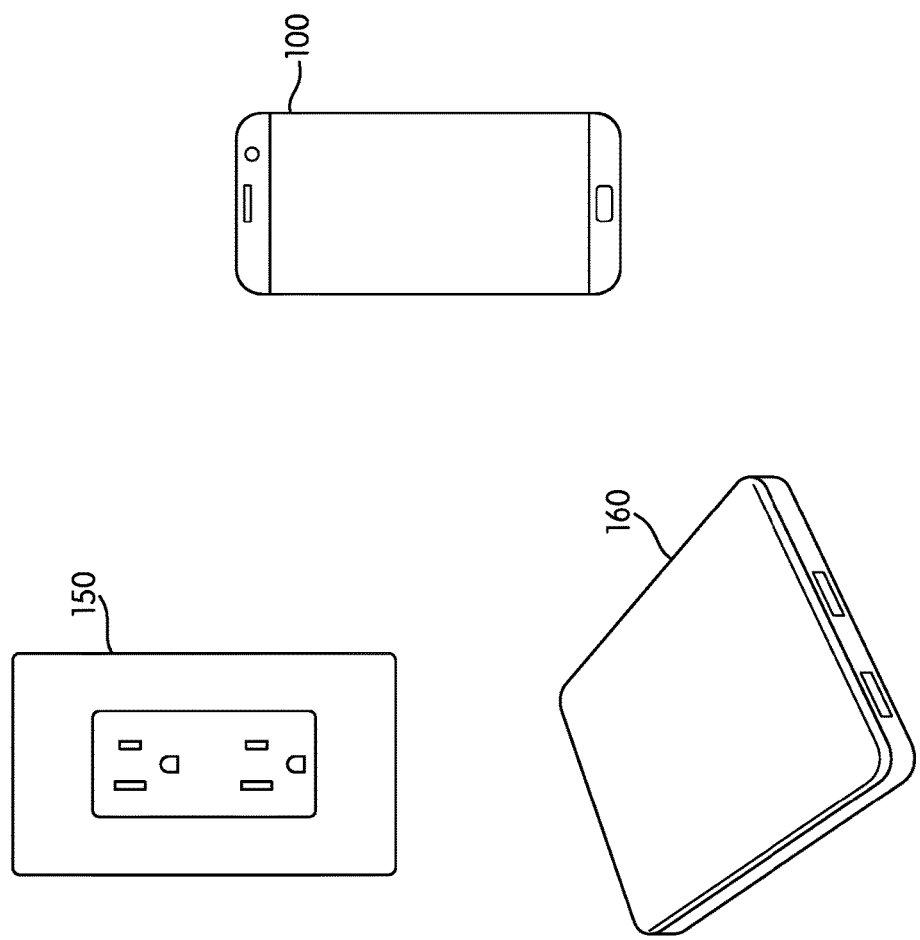

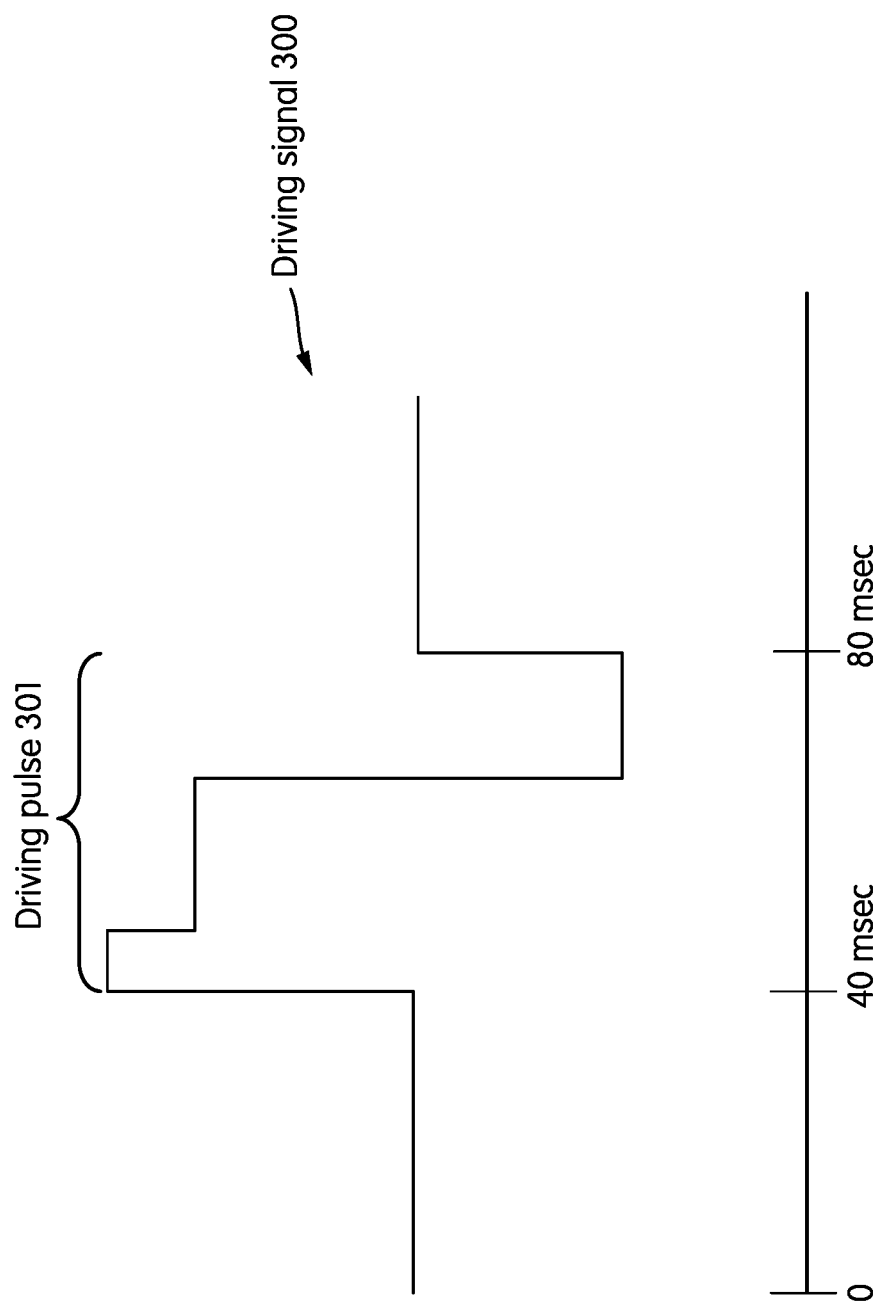

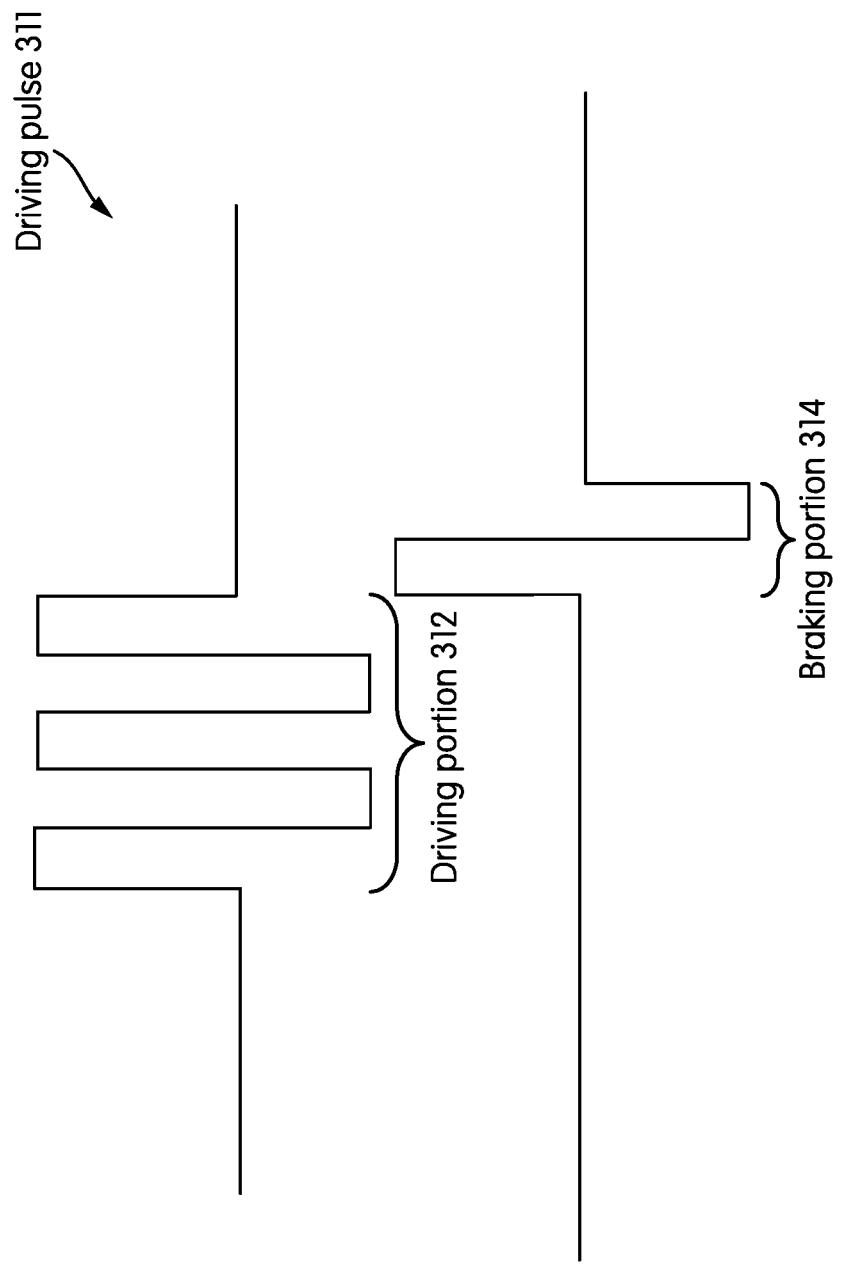

METHOD AND APPARATUS FOR DETERMINING ENERGY AVAILABILITY FOR A HAPTIC-ENABLED DEVICE AND FOR CONSERVING ENERGY BY SELECTING BETWEEN A BRAKING AND NON-BRAKING MODE

FIELD OF THE INVENTION

The present invention is directed to a method and apparatus for using or disabling braking based on an energy conservation setting, and has application in user interfaces, gaming, automotive, wearable devices, and consumer electronics.

BACKGROUND

Electronic device manufacturers strive to produce a rich interface for users. Many devices use visual and auditory cues to provide feedback to a user. In some interface devices, a kinesthetic effect (such as active and resistive force feedback) and/or a tactile effect (such as a vibration) are also provided to the user. Kinesthetic effects and tactile effects may more generally be referred to as "haptic feedback" or "haptic effects". Haptic feedback can provide cues that enhance and simplify the user interface. For example, vibration effects, or vibrotactile haptic effects, may be useful in providing cues to users of electronic devices to alert the user to specific events, or provide realistic feedback to create greater sensory immersion within a simulated or virtual environment.

To generate a haptic effect, many devices use an actuator. Example actuators for generating a haptic effect (also referred to as a haptic actuator) include an eccentric rotating mass ("ERM") actuator, in which an eccentric mass is moved by a motor, and a linear resonant actuator ("LRA"), in which a mass attached to a spring is driven back and forth. Other actuators include actuators that use a "smart material," such as a piezoelectric material, an electro-active polymer, or a shape memory alloy. In order to generate a haptic effect, a driving signal may be applied to a haptic actuator.

SUMMARY

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

One aspect of the embodiments herein relate to a haptic-enabled device that comprises a haptic actuator, an energy storage device, and a control unit. The haptic actuator is configured to generate a haptic effect. The energy storage device is configured to provide energy to the haptic actuator to generate the haptic effect. The control unit is communicatively coupled to the haptic actuator and is configured to determine an energy availability level for the haptic-enabled device, wherein the energy availability level indicates a level of energy available to the haptic-enabled device in an upcoming time period, the upcoming time period being calculated by the control unit or being predetermined, wherein the determination is based on an energy level of the energy storage device or an energy usage rate thereof. The control unit is further configured to determine an energy conservation setting for the haptic-enabled device based on at least one of (i) the energy availability level, and (ii) an input received by the haptic-enabled device for controlling the energy conservation setting. The control unit is further configured to determine, based on the energy conservation setting, whether to generate the haptic effect in a braking mode or in a non-braking mode. In response to a determination to generate the haptic effect in the braking mode, the control unit communicates a first drive signal to the haptic actuator, the first drive signal including a driving pulse having a driving segment followed by a braking segment, to generate the haptic effect. In response to a determination to generate the haptic effect in the non-braking mode, the control unit communicates a second drive signal to the haptic actuator, the second drive signal including a driving pulse having only a driving segment and no braking segment, to generate the haptic effect.

In an embodiment, when the determination is made to generate the haptic effect in the braking mode, the control unit is further configured to include a kick-in segment in the driving segment of the driving pulse of the first drive signal, wherein the kick-in segment is a pulse segment that is at a start of the driving segment and has a higher amplitude than a remaining part of the driving segment.

In an embodiment, when the determination is made to generate the haptic effect in the non-braking mode, the control unit is further configured to refrain from including any kick-in segment in the driving segment of the driving pulse.

In an embodiment, the control unit is further configured to control, based on the energy conservation setting, at least one of (i) an intensity of a driving segment of a driving pulse of the first or second drive signal used to generate the haptic effect, and (ii) a duration of a driving segment of a driving pulse of the first or second drive signal used to generate the haptic effect.

In an embodiment, the control unit is configured to generate the haptic effect to simulate a texture, wherein the control unit is configured to control, based on the energy conservation setting, a complexity level of the texture to be simulated by the haptic effect.

In an embodiment, the control unit is configured to apply, in the respective first or second drive signal, a plurality of driving pulses to the haptic actuator, wherein the control unit is configured to control, based on the energy conservation setting, a total number of driving pulses to apply to the haptic actuator in a predetermined unit of time.

In an embodiment, the haptic actuator is one of a plurality of haptic actuators of the haptic-enabled device, and wherein the control unit is further configured to select the haptic actuator from among the plurality of haptic actuators to generate the haptic effect, wherein the selection is based on the energy conservation setting.

In an embodiment, the haptic effect is generated in response to an event recognized by the control unit to trigger the haptic effect, wherein the control unit is configured to control, based on the energy conservation setting, which events trigger the haptic effect.

In an embodiment, the haptic-enabled device is configured to receive communication associated with respective user identities, and is configured to execute a communication application that processes the communication as communication events, and when the energy conservation setting has a first value, the control unit is configured to recognize all communication events associated with any user identity to trigger the haptic effect, and when the energy conservation setting has a second value, the control unit is configured to recognize communication events associated with a determined set of one or more user identities to trigger the haptic effect and to ignore all other communication events for determining whether to trigger the haptic effect.

In an embodiment, the haptic-enabled device is configured to execute a game application, and when the energy conservation setting has a first value, the control unit is configured to recognize a first event and a second event in the game application to trigger the haptic effect, and when the energy conservation setting has a second value, the control unit is configured to recognize the first event to trigger the haptic effect and to ignore the second event for determining whether to trigger the haptic effect, wherein the first event is associated with a higher priority level than the second event in a game application profile stored on the haptic-enabled device.

In an embodiment, the control unit is configured to determine the energy availability level further based on an estimated availability level of any external energy source for providing energy to the energy storage device of the haptic-enabled device in the upcoming time period.

In an embodiment, the control unit is configured to determine the estimated availability level of any external energy source based on at least one of (i) a geographic location of the haptic-enabled device, (ii) a moving speed of the haptic-enabled device, and (iii) an amount of time that has elapsed since the energy storage device of the haptic-enabled device was most recently charged.

In an embodiment, the control unit is configured to determine, based on the geographic location of the haptic-enabled device, whether the haptic-enabled device is at an outdoor location or an indoor location, and is configured to determine the estimated availability level of any external energy source for providing energy to the energy storage device of the haptic-enabled device based on whether the haptic-enabled device is at the outdoor location or at the indoor location.

In an embodiment, the control unit is configured to determine, based on the geographic location of the haptic-enabled device, whether the haptic-enabled device is at a home location or a work location, and is configured to determine the estimated availability of any external energy source for providing energy to the energy storage device of the haptic-enabled device based on whether the haptic-enabled device is at the home location or at the work location.

One aspect of the embodiments herein relate to a haptic-enabled device that comprises a haptic actuator, an energy storage device, and a control unit. The haptic actuator is configured to generate a haptic effect. The energy storage device is configured to provide energy to the haptic actuator to generate the haptic effect. The control unit is communicatively coupled to the haptic actuator and configured to determine an energy availability level for the haptic-enabled device, wherein the energy availability level indicates a level of energy available to the haptic-enabled device in an upcoming time period, and is based on at least one of (i) an energy level of the energy storage device or an energy usage rate thereof, and (ii) an estimated availability level of any external energy source for providing energy to the haptic-enabled device in the upcoming time period, the upcoming time period being calculated by the control unit or being predetermined. The control unit is further configured to determine an energy conservation setting for the haptic-enabled device based on at least one of (i) the energy availability level, and (ii) an input received by the haptic-enabled device for controlling the energy conservation setting. The control unit is further configured to control haptic effect generation in the haptic-enabled device based on the energy conservation setting.

In an embodiment, the control unit is configured to determine the estimated availability level of any external energy source for providing energy to the haptic-enabled device based on at least one of (i) a geographic location of the haptic-enabled device, (ii) a moving speed of the haptic-enabled device, and (iii) an amount of time that has elapsed since the energy storage device of the haptic-enabled device was most recently charged.

In an embodiment, the control unit is configured to determine, based on the geographic location of the haptic-enabled device, whether the haptic-enabled device is at an outdoor location or an indoor location, and is configured to determine the estimated availability level of any external energy source based on whether the haptic-enabled device is at the outdoor location or at the indoor location.

In an embodiment, the control unit is configured to determine, based on the geographic location of the haptic-enabled device, whether the haptic-enabled device is at a home location or a work location, and is configured to determine the estimated availability of any external energy source based on whether the haptic-enabled device is at the home location or at the work location.

In an embodiment, the control unit is configured to control haptic effect generation in the haptic-enabled device by controlling, based on the energy conservation setting, at least one of (i) availability of the haptic effect in the upcoming time period, (ii) an intensity of a driving segment of a driving pulse of a drive signal used to generate the haptic effect, and (iii) a duration of the driving segment of the driving pulse of the drive signal used to generate the haptic effect.

In an embodiment, the haptic actuator is one of a plurality of haptic actuators in the haptic-enabled device, wherein the haptic-enabled device is configured to store a plurality of actuator profiles that each indicates energy usage behavior of a respective haptic actuator of the plurality of haptic actuators, and wherein the control unit is configured to control haptic effect generation by selecting, based on the energy conservation setting and the actuator profiles, which one of the plurality of haptic actuators is to be used to generate the haptic effect.

In an embodiment, the control unit is configured to control haptic effect generation by controlling, based on the energy conservation setting, which events trigger the haptic effect.

Features, objects, and advantages of embodiments hereof will become apparent to those skilled in the art by reading the following detailed description where references will be made to the appended figures.

BRIEF DESCRIPTION OF THE DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 1A is a view of system that includes a haptic-enabled device and external energy sources, according to an embodiment hereof.

FIGS. 3A-3D each illustrates a driving signal having at least one driving pulse, according to an embodiment hereof.

DETAILED DESCRIPTION

Figure 1B:
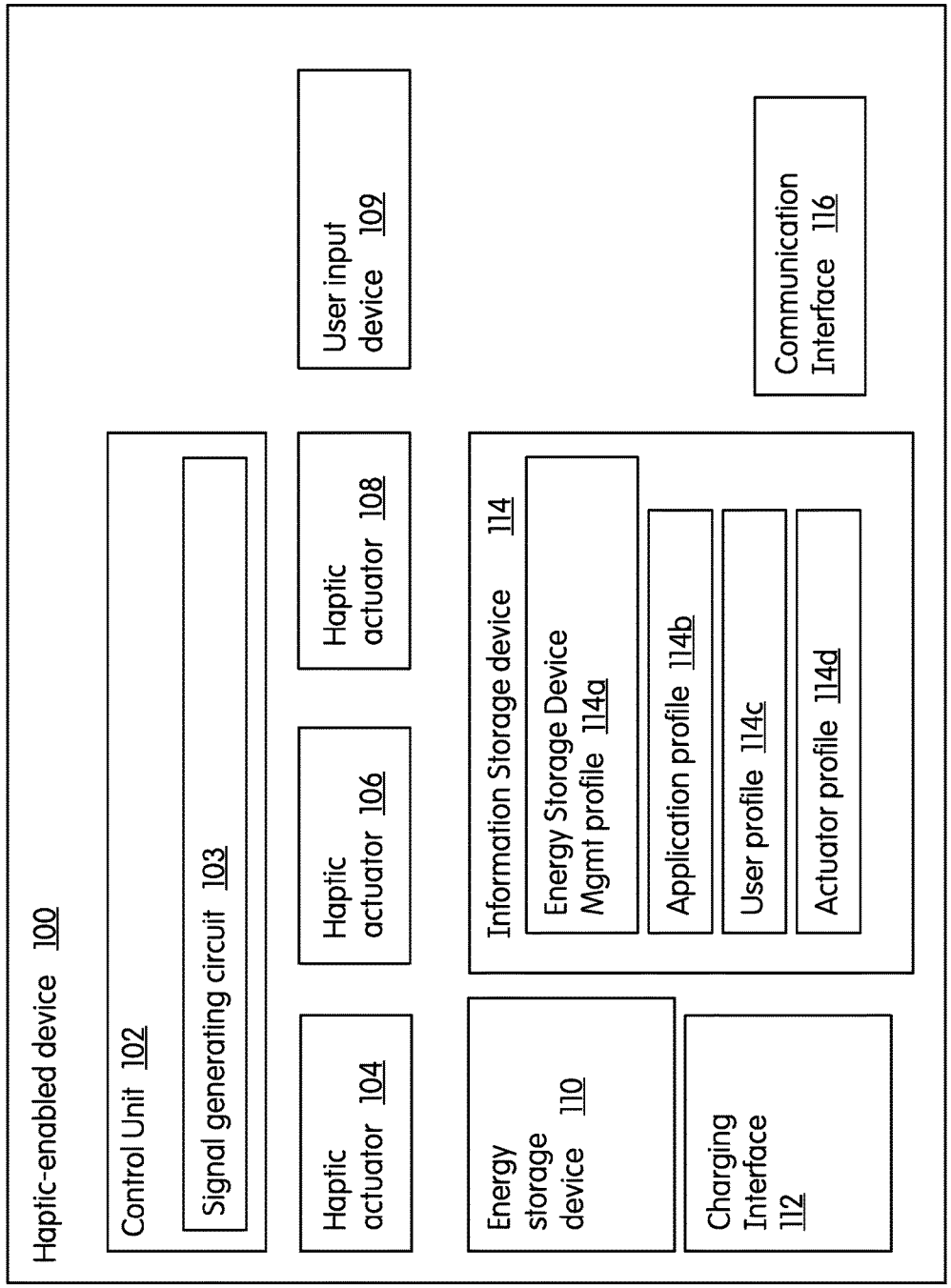
FIG. 1B is a block diagram of components of a haptic-enabled device, according to an embodiment hereof.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments hereof relate to adapting a haptic effect that is generated by a haptic-enabled device (e.g., mobile phone) based on whether the haptic-enabled device needs to conserve energy. If the haptic-enabled device determines that it needs to conserve energy, it may adjust a driving signal used to generate the haptic effect. The driving signal may include one or more driving pulses, and may be adjusted by adjusting: whether each of the driving pulses includes a braking segment, an intensity level of the driving pulses, a duration of each of the driving pulses, a total number of driving pulses in the driving signal, a length of time separating the driving pulses, and/or a frequency content of each driving pulse of the plurality of driving pulses. The language herein of energy usage and energy conservation may also apply to and cover power usage and power conservation (i.e., reducing the usage of power). Thus, the language of an energy conservation setting, an energy conservation mode, or features that depend on energy usage herein also covers situations involving a power conservation setting, a power conservation mode (i.e., a mode for reducing usage of power), or dependence on power usage.

In an embodiment, a property of a driving pulse, such as whether the driving pulse includes a kick-in segment, an intensity of the driving pulse, or an amount of time separating the driving pulse from another driving pulse may be based on whether the haptic-enabled device includes a braking segment in the driving pulse. The braking segment may be used for a haptic actuator which has a moveable component that can continue to move even after the haptic actuator is no longer being driven. This residual movement may arise from, e.g., inertia of the moving component, and/or from a natural oscillation of the moving component. For example, the inertia of a moving component in an eccentric rotating mass (ERM) actuator may cause the moving component to continue to rotate for a period of time even after the ERM actuator is no longer being driven. In another example, the moving component of a linear resonant actuator (LRA) may continue to naturally vibrate at a resonant frequency for a period of time even after the LRA is no longer being driven. This residual vibration may sometimes be referred to as a tail oscillation. The residual movement in a haptic actuator may reduce its ability to render a sharp or crisp haptic effect, such as a haptic effect intended to mimic the feeling of a button click. To render a sharp haptic effect, the actuator may need to not only actuate a moveable component, but also to quickly stop the moveable component in a short duration or period of time.

In an embodiment, a driving pulse may include a braking segment used to stop residual movement. In some instances, the braking segment may be 180° out of phase with a driving segment of the driving pulse of a drive signal, which may cause the braking segment to have an opposite polarity with the driving segment. Switching polarity (e.g., from a positive voltage to a negative voltage) to transition from a driving segment to a braking segment may consume an appreciable amount of energy. Thus, the haptic-enabled device may omit a braking segment from a driving pulse to save energy. Additionally, if the braking segment is not present to actively dampen residual movement in an actuator, the haptic-enabled device may attempt to compensate by lowering an intensity of a driving segment of the driving pulse of a drive signal, omitting a kick-in segment from the driving pulse, and/or spacing driving pulses farther apart in time. Such measures may lower an initial acceleration on a moveable component of a haptic actuator, so that residual movement of the moveable component may more quickly and naturally decay to an imperceptible level in an acceptable amount of time, without a braking segment.

In an embodiment, omitting a braking segment from a driving pulse may be considered to be operation in a braking-disabled mode. For instance, the haptic-enabled device may receive a command to generate a haptic effect, such as a command generated by a game or other application executing on the haptic-enabled device. The command may include a high level description of the haptic effect (e.g., a 500 msec pulse) or a low level description of the haptic effect (e.g., a waveform, which may be referred to as a force profile or actuation profile, that describes desired movement of, e.g., a moveable component in a haptic actuator as a function of time). The haptic-enabled device may be configured to generate a drive signal based on the description of the haptic effect. This process may be referred to as rendering the haptic effect, and may rely on an algorithm and/or a software library. In a standard rendering, the haptic-enabled device may attempt to generate a haptic effect which is as close as possible to the force or actuation profile. If the force or actuation profile involves sharp effects (e.g., sudden acceleration or sudden stoppage of a moveable component), the haptic-enabled device may operate in an automatic braking mode in which it uses braking segments in a drive signal to render the haptic effect. For example, in an Extended ERM Support (EES) platform, a haptic-enabled device may use automatic braking to predict and control when a rotating mass is spinning or not spinning. In this embodiment, when energy needs to be conserved, the haptic-enabled device may employ a less accurate rendering that does not use any braking segment in a driving signal, and may render a haptic effect which is not as sharp or crisp as with a standard rendering. This situation may be considered a braking-disabled mode or a braking-disabled rendering. The type of rendering that is selected (e.g., standard rendering or braking-disabled rendering) may be part of a haptic effect setting determined by the haptic-enabled device. The haptic effect setting may be used to control how the drive signal is generated.

In an embodiment, the availability of a braking-disabled rendering in addition to the standard rendering may also provide additional flexibility to a programmer or haptic effect designer. For example, the haptic-enabled device may provide an application programming interface (API) that allows code in an application (e.g., a game) to command, through the API, that the haptic-enabled device is to use a braking-disabled rendering or to use a standard rendering to generate a haptic effect, or to command a haptic-enabled device to select a type of rendering based on whether energy needs to be conserved in the haptic-enabled device. Such an API may provide a programmer or haptic effect designer with more control over when an automatic braking algorithm is used. In an embodiment, if the haptic-enabled device receives no commands regarding the type of rendering to use, it may operate by default in an automatic braking mode and in a mode in which it uses standard rendering to generate a haptic effect.

In an embodiment, if a haptic-enabled device determines that it needs to conserve energy, it may adjust the intensity of the driving pulses, omit respective kick-in segments from the driving pulses, and/or space the driving pulses farther apart in time, regardless of whether the driving pulses include respective braking segments. In an embodiment, the adjusting of the intensity or duration of driving pulses may be independent of whether or not braking is used.

In an embodiment, the haptic-enabled device may conserve energy by alternatively or additionally selecting a haptic effect which has reduced complexity, and/or selecting which haptic actuator is used to generate a haptic effect. A more complex haptic effect may need to be rendered with a higher level of sharpness or crispness, which may need braking to accomplish. By selecting a haptic effect which has reduced complexity, such as a haptic effect whose sensation is less sharp or less crisp, the haptic-enabled device may be able to omit the use of braking to conserve energy.

In an embodiment, an energy conservation setting may represent whether a haptic-enabled device needs to conserve energy. The energy conservation setting may be determined based on, e.g., at least one of: a remaining amount of energy stored in a battery or other energy storage device (e.g., capacitor) of the haptic-enabled device, a rate of energy usage by the haptic-enabled device, an estimated availability level of an external energy source in an upcoming time period to charge the battery of the haptic-enabled device, and user preference with respect to conserving energy in the haptic-enabled device.

In an embodiment, the haptic-enabled device may determine an energy availability level that estimates an availability of an external energy source for charging an energy storage device (e.g., battery) of the haptic-enabled device. The estimated availability of an external energy source may be based on contextual information, such as a geographic location of the haptic-enabled device, a moving speed of the haptic-enabled device, and an amount of time that has elapsed since the energy storage device of the haptic-enabled device was most recently charged. In one embodiment, the geographic location of the haptic-enabled device may indicate whether the device is at an indoor location or an outdoor location. In an embodiment, the haptic-enabled device may have a global positioning system (GPS) device, and haptic-enabled device may determine the geographic location with the GPS device. If the haptic-enabled device is located at an outdoor location (e.g., on a camping trip), the estimated availability of an external energy source, if any, may be low. In another embodiment, a high moving speed may indicate that the haptic-enabled device is in a vehicle (e.g., in a car), where the estimated availability of an external energy source may be inferred to be lower compared to a situation in which the haptic-enabled device is stationary. In yet another embodiment, if the haptic-enabled device determines that it is generally charged every 24 hours, and that more than 24 hours has elapsed since the battery of the haptic-enabled device was most recently charged, the haptic-enabled device may infer that this is because a user of the device does not have access to an external energy source.

FIG. 1A illustrates a haptic-enabled device 100 and external energy sources 150 and 160. The haptic-enabled device 100 may be a mobile phone, as presented in FIG. 1A, a tablet computer or any other type of computer, a wearable device such as a smart watch or headphones, a game console controller, or any other haptic-enabled device. In an embodiment, the haptic-enabled device 100 may be powered by a battery or any other energy storage device (e.g., capacitor). The external energy sources 150, 160 may be, e.g., sources of energy which are external to the haptic-enabled device 100 and which may be used to charge a battery or any other energy storage device of the haptic-enabled device 100. The external energy source 150 may be an electrical outlet, and the external energy source 160 may be a portable battery that is external to the haptic-enabled device 100.

FIG. 1B provides a block diagram of the haptic-enabled device 100. The block diagram depicts components of the haptic-enabled device 100. The components include a control unit 102, haptic actuators 104, 106, 108, a user input device 109, an energy storage device 110, a charging interface 112, an information storage device 114, and a communication interface 116. In an embodiment, the control unit 102 is configured to control the haptic actuators 104, 106, and 108. For instance, the control unit 102 may control a signal generating circuit 103, which generates a driving signal that is communicated (e.g., applied) to one or more of the haptic actuators 104, 106, 108. The signal generating circuit 103 may be a circuit that is part of the control unit 102, as shown in FIG. 1B, or may be separate from the control unit 102. In an embodiment, the control unit 102 may be a processing circuit, such as a microprocessor configured to execute instructions stored on a non-transitory computer-readable medium (e.g., information storage device 114), a programmable logic array (PLA), a field programmable gate array (FPGA), or any combination thereof. In an embodiment, the control unit 102 may also be a general purpose processor for the haptic-enabled device.

A haptic-enabled device of the embodiments herein may include only one haptic actuator, or may include a plurality of haptic actuators, as illustrated in FIG. 1B. In an embodiment, the haptic actuators 104, 106, and 108 in FIG. 1B may be the same type of haptic actuators, or may be different types of haptic actuators. Embodiments of haptic actuator types include an eccentric rotating mass (ERM) actuator, a linear resonating actuator (LRA), a solenoid resonating actuator (SRA), and a haptic actuator based on a smart material, such as a piezoelectric actuator, an electroactive polymer (EAP) actuator, or any other haptic actuator. An actuator of the haptic actuators 104, 106, and 108 may be located at any region of a haptic-enabled device. For example, it may be a body actuator embedded within a body of the haptic-enabled device, or a targeted actuator coupled to a particular part of the haptic-enabled device 100 to provide a kinesthetic haptic effect at that part.

In an embodiment, the energy storage device 110 of the haptic-enabled device 100 may be a lithium ion battery, any other type of battery, or any other type of energy storage device. The energy storage device 110 may be located within a housing of the device 100, or attached to the housing of the device 100. The energy storage device 110 may be charged through a charging interface 112, such as a USB or Lightning® interface.

In an embodiment, the user input device 109 may be, e.g., a touch screen, touch pad, microphone, and/or keyboard configured to receive user input. In an embodiment, user input may be received through a communication interface 116, such as an IEEE 802.15 (Bluetooth®) or IEEE 802.11 (Wi-Fi®) interface. The user input may be used to affect an energy conservation setting, as discussed below in more detail.

In an embodiment, the information storage device 114 may be a solid state drive (SSD), a hard disk, or any other type of information storage device. Information which may be stored on the information storage device 114 in this embodiment includes profiles which the control unit 102 may use in determining whether and/or how energy usage is to be reduced when generating haptic effects. The profiles may include, e.g., an energy storage device management profile 114a, an application profile 114b, a user profile 114c, and an actuator profile 114d. These profiles are discussed in more detail below.

Figure 2:
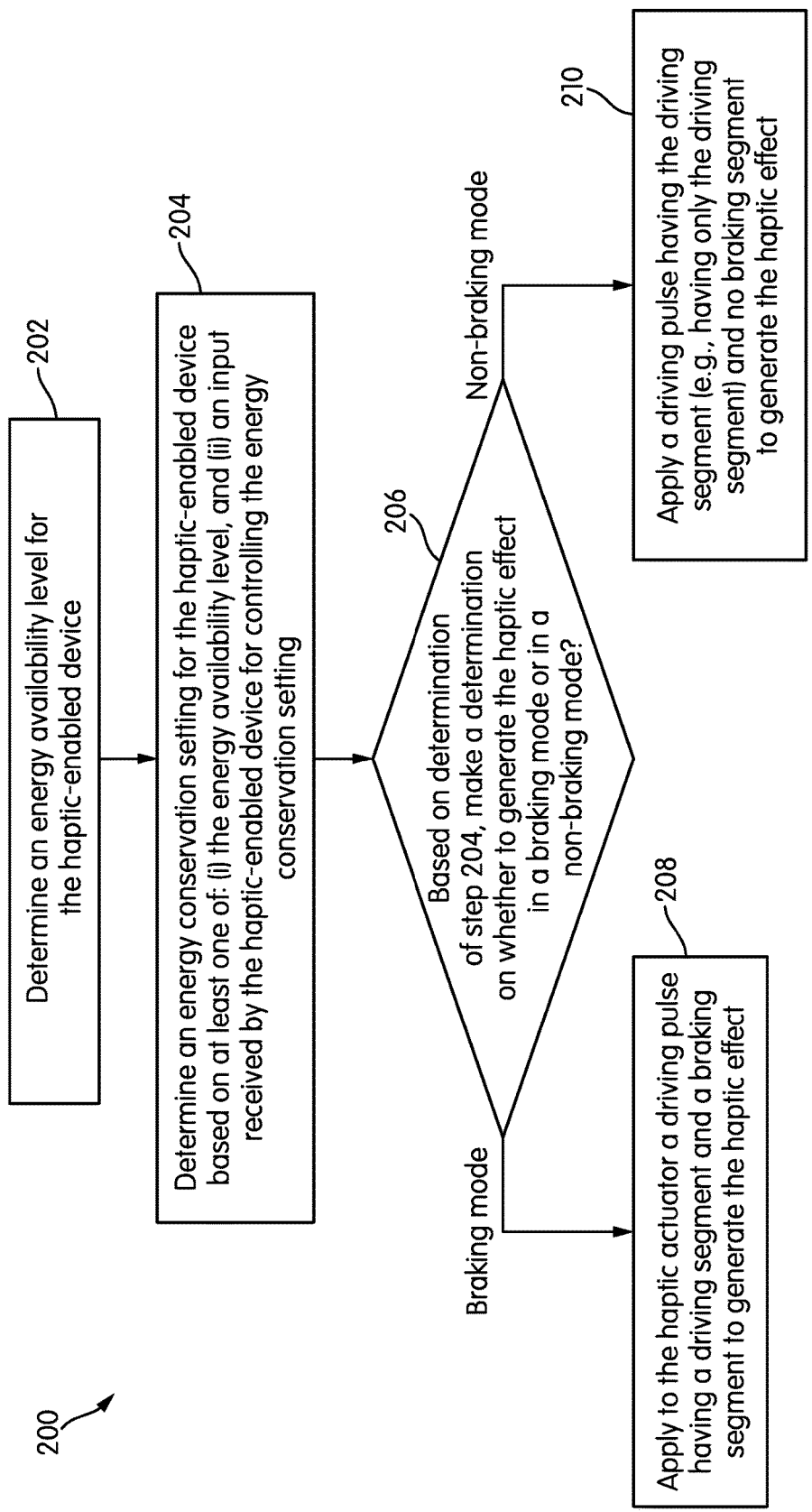
FIG. 2 is a flow diagram that depicts steps of a method of generating a haptic effect, according to an embodiment hereof.

FIG. 2 illustrates a flow diagram which illustrates steps of a method 200 for generating a haptic effect. The steps may be performed by, e.g., the control unit 102 of the haptic-enabled device 100. In an embodiment, the method 200 may begin at step 202, in which the control unit 102 determines an energy availability level for the haptic-enabled device. The energy availability level may indicate a level of energy available to the haptic-enabled device in an upcoming time period (e.g., an upcoming 12 hour period or 24 hour period). In some instances, method 200 is performed by a haptic-enabled device which is being powered by a battery or other energy storage device. In those instances, determining the energy availability level may be based on an energy level of the energy storage device, an energy usage rate for the energy storage device, and/or an estimated availability level of an external energy source, if any, for providing energy to the haptic-enabled device in the upcoming time period for charging the energy storage device. The value of the upcoming time period may be predetermined and fixed (e.g., preset at 24 hours), or may be a value that is calculated and updated by the haptic-enabled device (e.g., calculated by a control unit of the haptic-enabled device). In an embodiment, the value of the upcoming time period (e.g., 24 hours) may broadly correspond to how soon an external energy source needs to be available before the haptic-enabled device 100's own energy storage device 110 will be depleted. For instance, the value of the upcoming time period may correspond to an estimated duration for which the energy storage device 110 is expected to be able to provide energy by itself to the haptic-enabled device 100. As a more specific example, the energy storage device 110 may be a battery with a full battery life of 24 hours, where the full battery life refers to how long a fully charged battery (i.e., when the battery is at 100% state of charge (SoC)) can provide energy to the haptic-enabled device 100 during average use, during high energy use, or during some other type of energy usage scenario. In this example, the upcoming time period may simply be a fixed value equal to the full battery life of 24 hours, regardless of a current energy level of the energy storage device 110. Alternatively, the upcoming time period may be a calculated value based on the full battery life and the current energy level. For example, if the current energy level of the energy storage device 110 is, e.g., 50% SoC, the upcoming time period may be calculated by multiplying the current energy level by the full battery life (i.e., 50%×24 hours=12 hours). In one example, the value of the upcoming time period may fall in a range from 1-2 hours, 2-8 hours, 8-12 hours, and 12-24 hours.

In an embodiment, the energy level of a battery may be expressed as a state of charge (SoC), with a value between 0% and 100%, as an estimated amount of time that the battery's energy will last (e.g., 2 hours), or any other value. The energy usage rate for a battery may be expressed as, for instance, a number of milliwatts (mW) the haptic-enabled device is currently consuming, or may also be expressed by the estimated amount of time that the battery's energy will last. The estimated availability of an external energy source, if any, may be expressed as, e.g., a probability value (e.g., 75%) or any other value. As discussed above, the above values may, collectively or individually, be used to determine an energy availability level for the haptic-enabled device. In an embodiment, the determined energy availability level may be expressed as a value selected from the options of "High," "Medium," or "Low", or any other value. In an embodiment, if the energy availability level does not take into account the estimated availability of an external energy source for providing energy to the haptic-enabled device, the energy availability level in an upcoming time period may simply be equal to the current energy level of the energy storage device. In an embodiment, if the energy availability level does take into account the estimated availability of an external energy source for charging the energy storage device, the energy availability level may be equal to or based on an amount of energy estimated to be available from the external energy source in the upcoming time period (e.g., based on an estimated 10,000 mWh available from an external battery, or based on an "unlimited" amount available from an outlet).

In an embodiment, an energy storage device management profile (e.g., profile 114a) may provide information to the control unit 102 on a current energy level of the energy storage device (e.g., device 110), a list of times at which the energy storage device has been charged, an amount of time that has elapsed since the energy storage device was last charged, or any other information concerning the energy storage device.

In step 204, the control unit may determine an energy conservation setting for the haptic-enabled device. The determination may be based on at least one of: (i) the energy availability level determined in step 202, and (ii) an input received by the haptic-enabled device for controlling the energy conservation setting. In an embodiment, the energy conservation setting may have a plurality of modes, such as a normal mode, which indicates that energy does not need to be conserved in an upcoming time period (e.g., in an upcoming 12 hour period), and one or more energy saving modes (e.g., a medium energy saving mode and an ultra-energy saving mode), which indicate that energy needs to be conserved in the upcoming time period. In an embodiment, after the upcoming time period ends, the energy conservation setting may be determined again, may remain unchanged, or may reset to some default value.

In an embodiment, a control unit (e.g., unit 102) may determine an energy conservation setting based on whether an energy availability level falls to or below a defined threshold. The threshold(s) may be defined in, e.g., energy storage device management profile 114a. Example thresholds or threshold values include a value of "Low", a value of 30%, a value of 20%, or a value of 30 minutes of remaining battery time. If no threshold has been reached, the control unit may set the energy conservation setting to the normal mode, unless overridden by an input (e.g., user input) received by the haptic-enabled device for controlling the energy conservation setting. If a threshold has been reached, the control unit 102 may set the energy conservation setting to an energy saving mode (unless overridden by an input, such as a user input as mentioned above). If the haptic-enabled device has multiple energy saving modes, different thresholds may trigger different energy saving modes. For instance, an energy availability level of "Medium" may trigger a medium energy saving mode, while an energy availability level of "Low" may trigger an ultra energy saving mode. As stated above, a determination of the energy conservation setting for the haptic-enabled device may also be based on an input received by the haptic-enabled device for controlling the energy conservation setting. The input may be user input received from a user input device (e.g., device 109) or a communication interface (e.g., interface 116). The input may identify an energy conservation setting desired by a user, and may override or otherwise influence a determination based on the energy availability level.

In step 206, the control unit may be configured, based on the energy conservation setting, to make a determination or selection between generating a haptic effect in a braking mode or in a non-braking (e.g., braking-disabled) mode. For instance, a normal mode, in which energy conservation is not needed, may correspond to a braking mode, and an energy conservation mode may correspond to a braking-disabled mode. In some cases, this determination may be made in response to a command to generate a haptic effect. In some cases, this determination may be made independent of such commands (e.g., made periodically), so that the control unit may already have determined which mode to use when such a command is received. Additionally, as discussed above, a software library used for generating haptic effects may provide an API as an interface between functionality of the software library and programmers using the software library. The API may provide the option of being energy conscious in generating haptic effects, including a command which allows a programmer to invoke step 206.

In step 208, in response to a determination or selection in step 206 to generate the haptic effect in a braking mode, the control unit may be configured to apply or otherwise communicate to the haptic actuator a driving pulse having a driving segment followed by a braking segment to generate the haptic effect. Alternatively, in step 210, in response to a determination in step 206 to generate the haptic effect in a braking-disabled mode, the control unit may be configured to apply or otherwise communicate the driving pulse having the driving segment and no braking segment.

In an embodiment, a haptic effect may be associated with a particular command to generate the haptic effect. For instance, an application (e.g., a game application or video application) being executed on the haptic-enabled device may issue a software command to output a haptic effect. The software command may be, e.g., a haptic command that is defined in the software library or API. The haptic command may be issued to a lower-level application running on a control unit (e.g., unit 102) of the haptic-enabled device, which may generate a driving signal based on the haptic command and apply the driving signal to one or more haptic actuators. If the application issues multiple, separate haptic commands, the resulting output of the one or more haptic actuators of the haptic-enabled device may be considered respective separate haptic effects. In another embodiment, if a control unit uses an algorithm multiple times in response to multiple, separate haptic commands, the resulting output from each use of the algorithm may be considered a separate haptic effect.

FIG. 3A illustrates a first driving signal 300 made up of a 40 msec driving pulse 301. Generally speaking, a driving signal may be, e.g., any voltage or current waveform that can be applied to an actuator. A driving pulse may be, e.g., a nonzero part of the waveform that is preceded by a period (e.g., 100 or 500 milliseconds) of zero voltage and is followed by a period (e.g., 100 milliseconds) of zero voltage. A driving signal may have only one driving pulse, or may have multiple driving pulses that are separated by a period of substantially zero voltage or current.

Figure 3B:
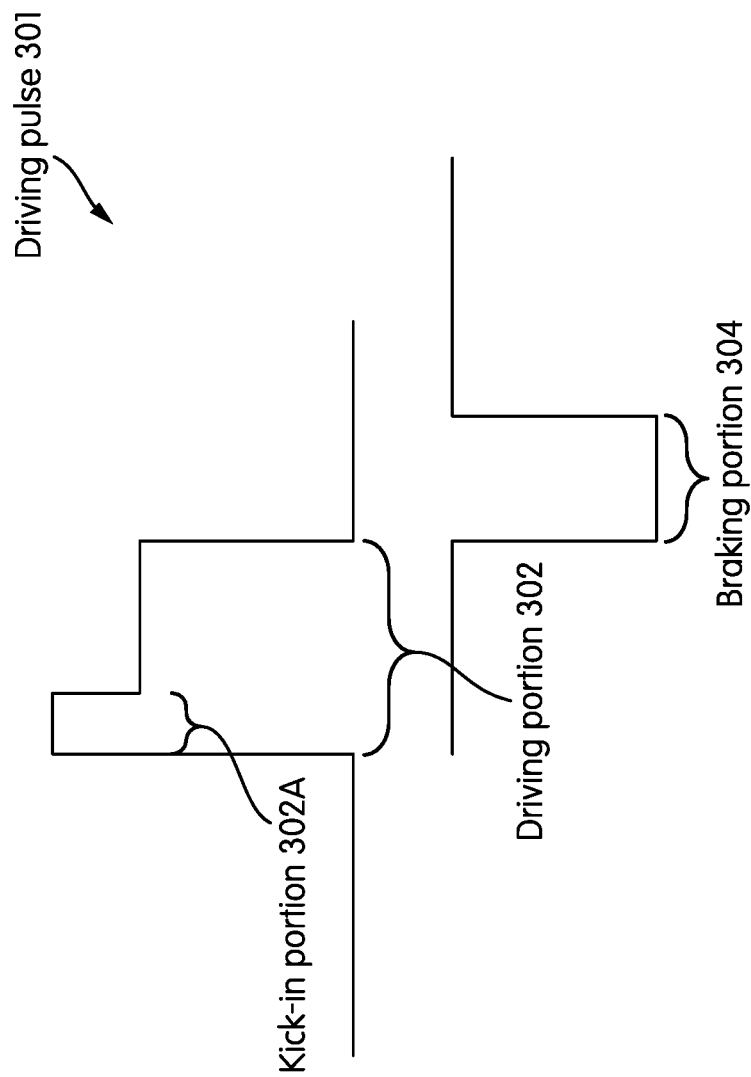

FIG. 3B depicts the driving pulse 301 of the first driving signal 300 to include a driving segment 302 and a braking segment 304. The driving segment 302 may be configured to, e.g., actuate a moveable component of an actuator (e.g., an ERM actuator) to output a haptic effect. In an embodiment, a driving segment 302 of the driving pulse 301 may include a kick-in segment 302A. The kick-in segment 302A may be, in an embodiment, a pulse segment that is at a start of the driving segment 302 and has a higher amplitude than a remaining part of the driving segment 302. The kick-in segment 302A may be used to increase an initial acceleration (e.g., to overcome static friction) of a moveable component (e.g., a rotating mass or a piezoelectric element) of an actuator, so as to cause a resulting haptic effect to be more perceptible.

In an embodiment, the braking segment 304 may be configured to brake a moveable component of a haptic actuator, such as by acting against an inertia or natural vibration of the moveable component. The inertia or natural vibration may eventually decay to an imperceptible level without the braking segment 304, but an extended decay period may deprive the haptic effect of a crisp or sharp sensation. A sharp or crisp sensation may be desirable for simulating, e.g., the press of a mechanical button on the haptic-enabled device. In an embodiment, the braking segment 304 may be a segment of the pulse 301 which is opposite in polarity to the driving segment 302. In an embodiment, a braking segment may be a segment of a driving pulse that is opposite in phase (e.g., 180° out of phase) with a driving segment of the driving pulse.

Figure 3C:
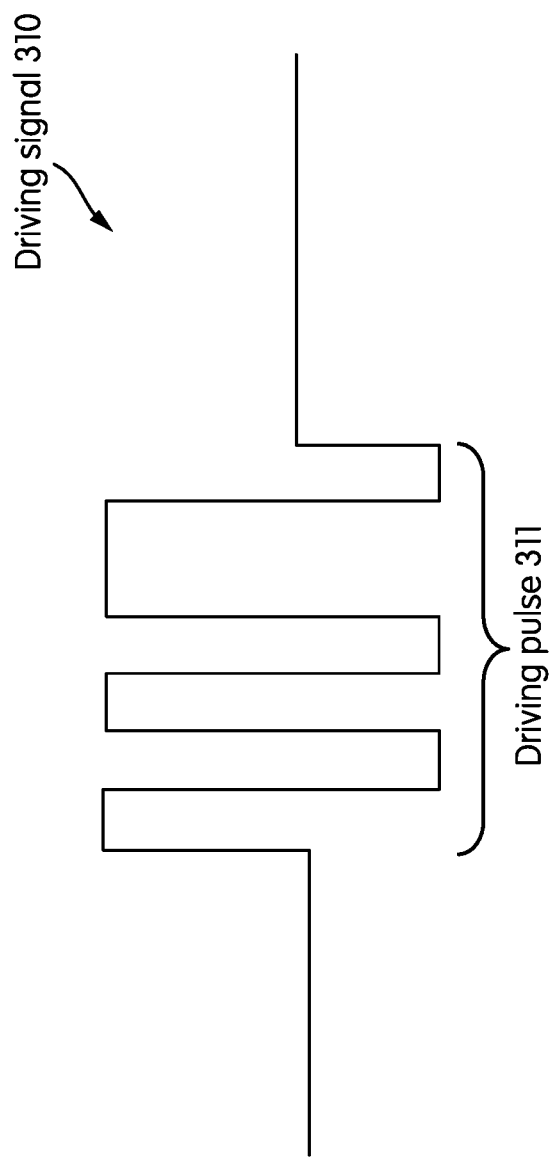

FIGS. 3C and 3D provide an embodiment of a driving pulse which has a driving segment and a braking segment which is 180° out of phase with the driving segment. More specifically, FIG. 3C illustrates a driving signal 310 which is made up of a driving pulse 311. FIG. 3D illustrates that the driving pulse 311 includes a driving segment 312 and a braking segment 314. The driving segment 312 may be configured to actuate a moveable component of an actuator, such as a linear resonant actuator, to output a haptic effect. The driving segment 312 may have the form of a square wave, as illustrated in FIG. 3D, a sinusoidal wave, or any other wave shape. It may have a frequency which matches a resonant frequency of the actuator, a frequency that is less than the resonant frequency, or a frequency that is greater than the resonant frequency. The braking segment 314 may be opposite in phase to the driving segment 312. The braking segment 314 also have the form of a square wave, as shown in FIG. 3D, a sinusoidal wave, or any other wave shape. It may also have a frequency which matches a resonant frequency of the actuator, or may have a different frequency than the resonant frequency.

Figure 3E:
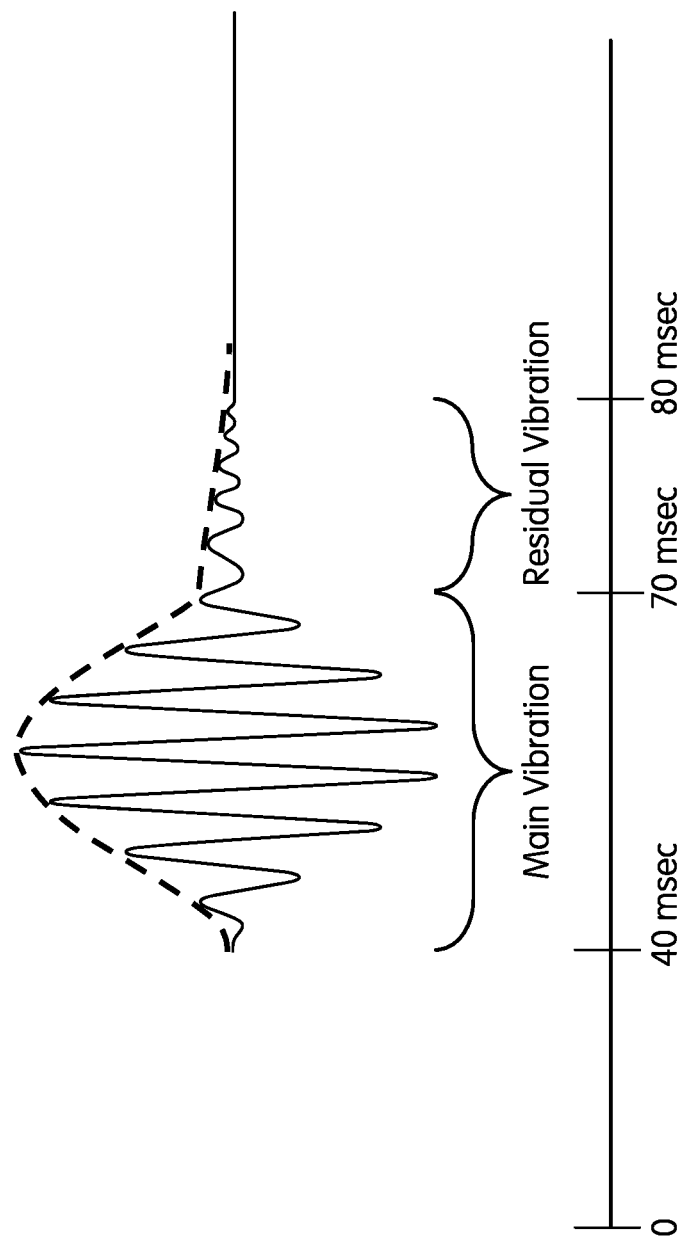
FIGS. 3E and 3F illustrate waveforms representing a haptic effect on a haptic-enabled device, according to an embodiment hereof.
Figure 3F:
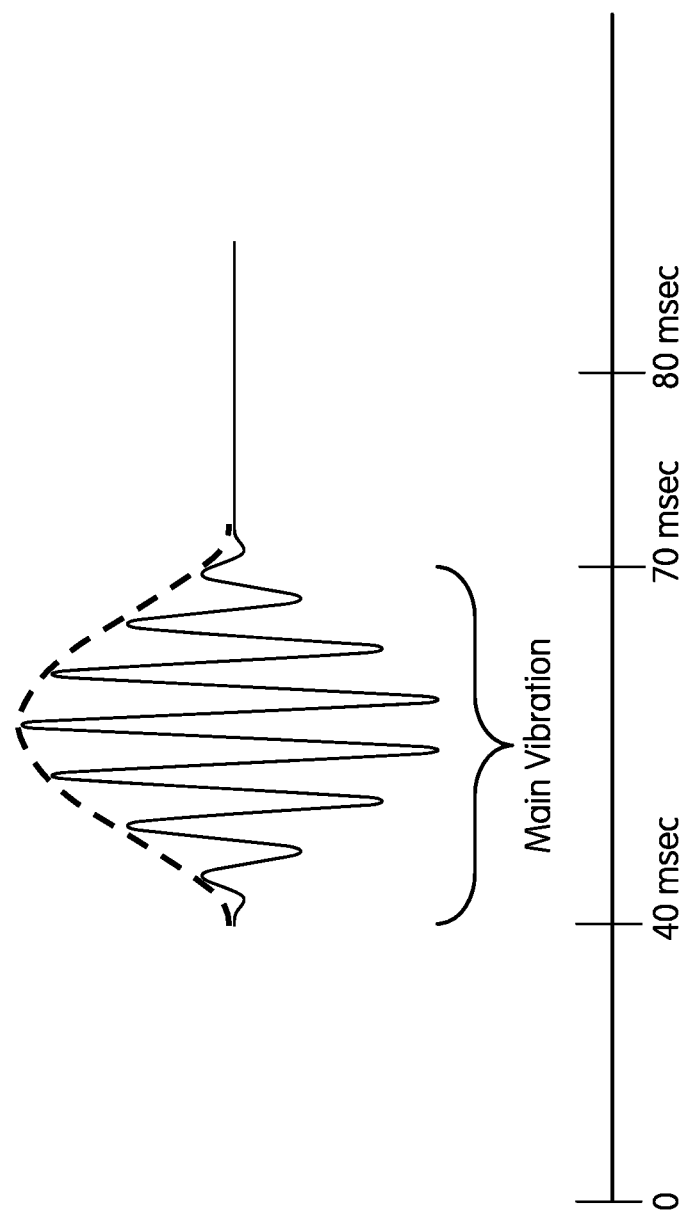

FIGS. 3E and 3F represent vibrations caused by a driving signal. More specifically, the waveform in FIGS. 3E and 3F may represent, e.g., a measured force profile or other measurement of vibrating movement of a moveable component or of a vibrating surface. The vibration in FIG. 3E may correspond to a haptic effect generated with a driving signal that did not include a braking segment. In this embodiment, the vibration may include a residual vibration which follows the main vibration. The residual vibration may arise from natural vibration of the moveable component or vibrating surface. The vibration in FIG. 3F may correspond to a haptic effect generated with a driving signal that includes a braking segment(s). In FIG. 3F, the haptic effect may eliminate or substantially reduce the presence of any residual vibration.

In an embodiment, any of the waveforms in FIGS. 3A-3D may be dynamically generated by a control unit, or may be stored in an information storage device. For instance, the driving segment 302 and the braking segment 304 may each be stored as a waveform in the information storage device. The control unit may have an automatic braking mode in which it includes the braking segment 304 by default in driving signals to be applied to an actuator. The control unit may be able to switch to a braking-disabled mode in which it excludes the braking segment 304 from driving signals to be applied to an actuator.

Figure 4A:
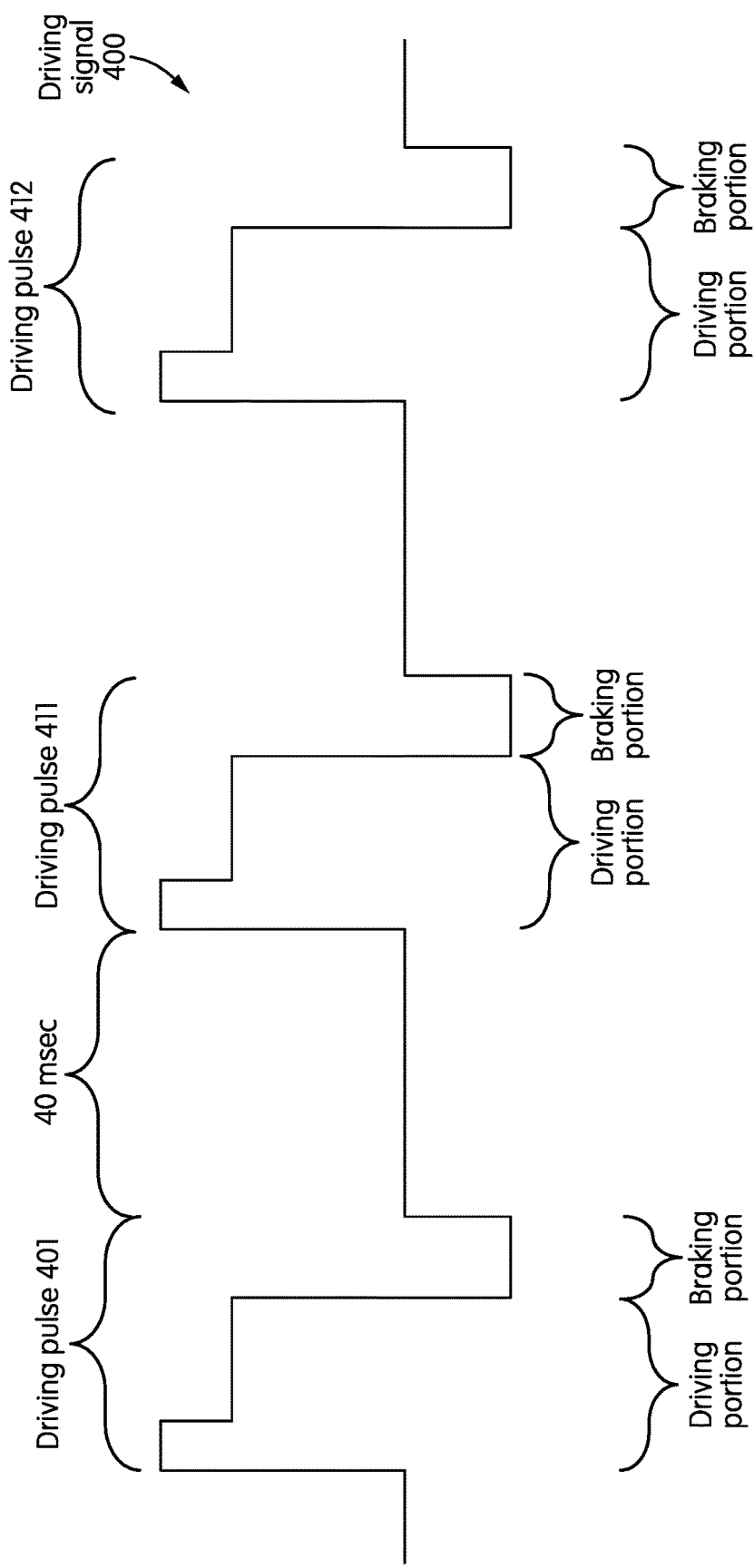
FIGS. 4A and 4B illustrate driving signals which include braking segments, according to an embodiment hereof.
Figure 4B:
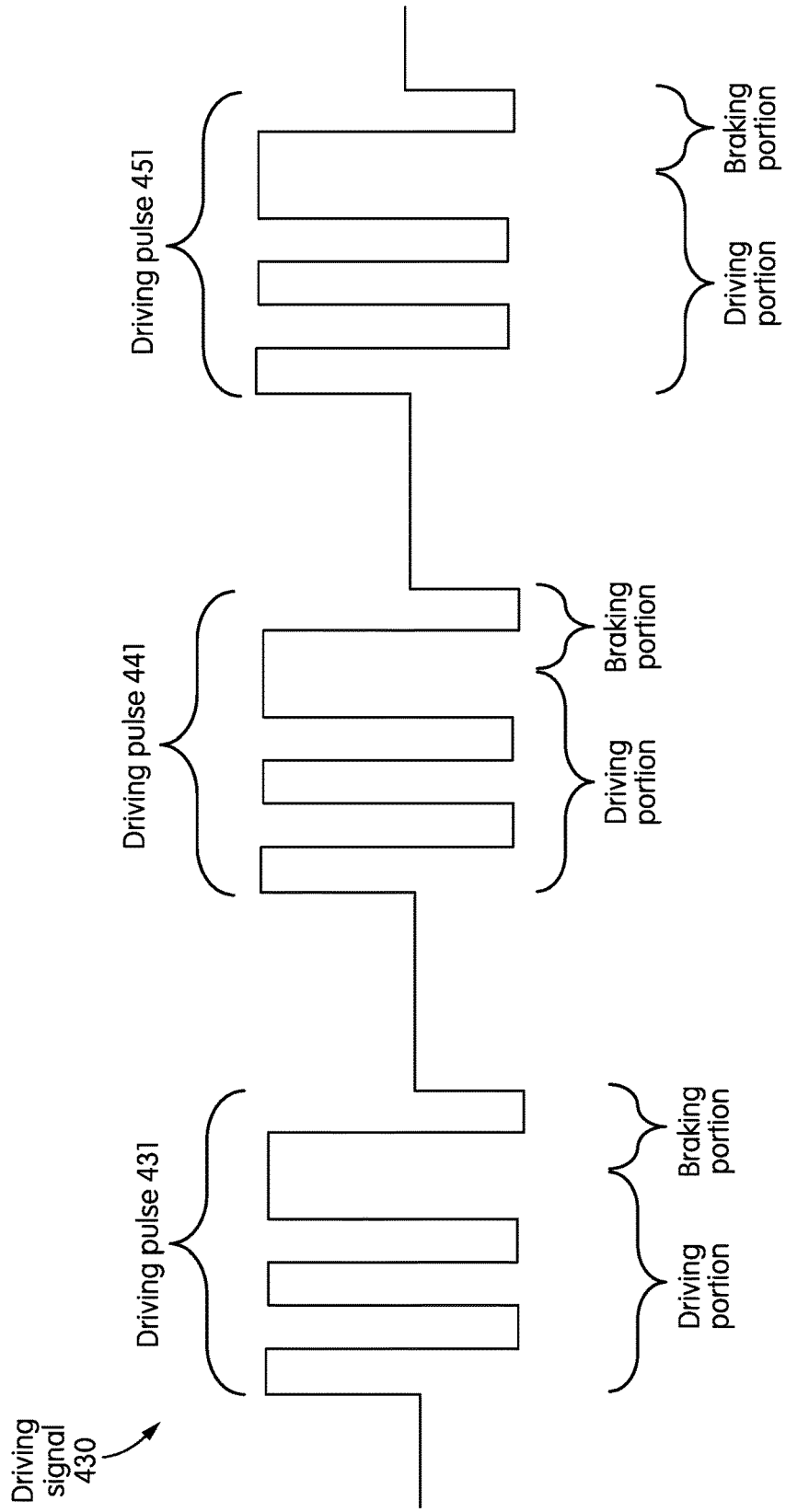

In an embodiment, a driving signal may include a plurality of pulses. For example, FIG. 4A illustrates a driving signal 400 which includes three pulses 401, 411, and 412. Each of the pulses in FIG. 4A may include a driving segment and a braking segment. Similarly, FIG. 4B depicts a driving signal 430 which includes three pulses 431, 441, and 451. Each of the driving pulses in FIG. 4B also includes a driving segment and a braking segment.

Figure 5A:
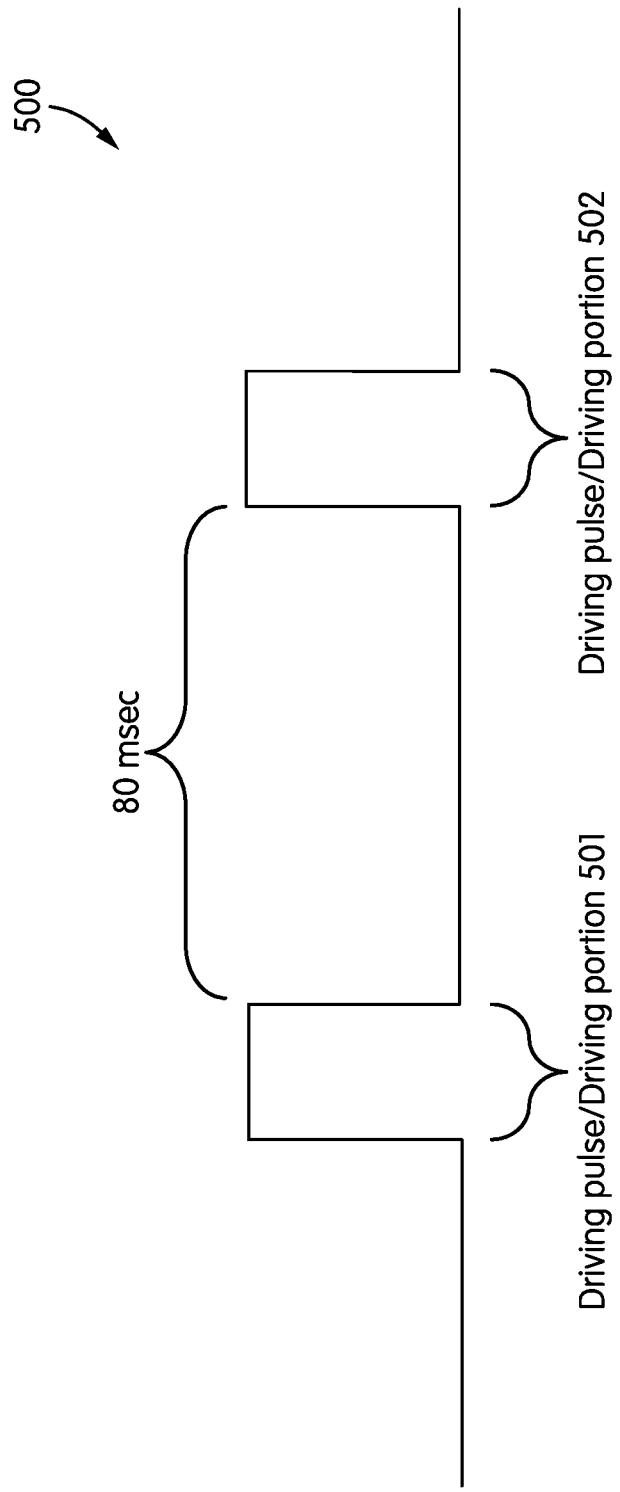
FIGS. 5A and 5B illustrate driving signals which omit braking segments, according to an embodiment hereof.
Figure 5B:
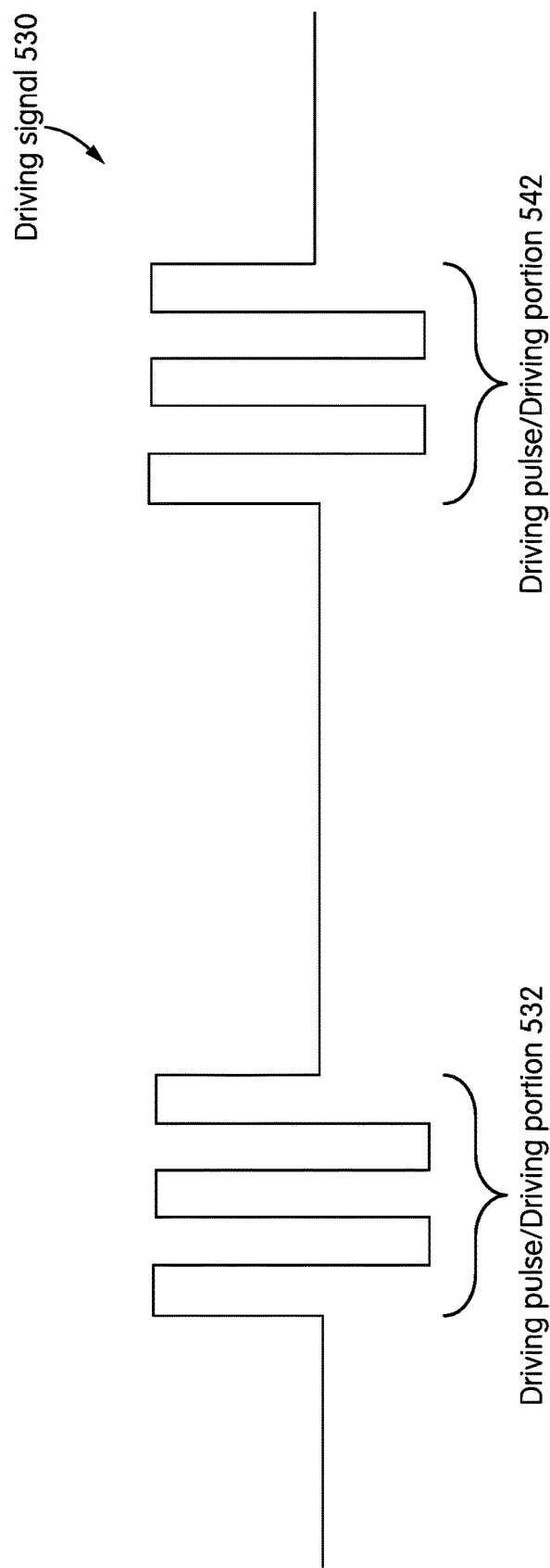

As discussed above, a haptic effect may be generated in a non-braking mode (e.g., braking-disabled mode) in order to save energy. In the non-braking (e.g., braking-disabled mode) mode, a driving signal may omit any braking segment. For instance, FIG. 5A illustrates a driving signal 500 which has two driving pulses 501 and 502. The driving pulses 501, 502 have only respective driving segments and no braking segment. Similarly, FIG. 5B depicts a driving signal 530 which has two driving pulses 532, 542 that have only respective driving segments, and no braking segment.

In an embodiment, the braking-disabled mode may be a more specific form of a non-braking mode. More particularly, the generating of a braking segment for a haptic actuator in a haptic-enabled device may be performed by default, or may be omitted by default. In a situation in which the braking segment is generated by default, the non-braking mode may be a braking-disabled mode in which a control unit (e.g., control unit 102) executes computer-readable instructions that expressly suppress or otherwise disable the default generating of the braking segment. In a situation in which the braking segment is omitted by default, the non-braking mode may simply involve the control unit making a determination not to generate the braking segment.

As discussed above, when a determination is made to generate a haptic effect in a braking mode, a control unit may be configured to use a kick-in segment (e.g., include kick-in segment 302A in a driving segment of a driving pulse of a drive signal) to increase initial acceleration of a moveable component of the actuator, even though the kick-in segment may prolong the natural oscillation or other residual movement of the moveable component. The kick-in segment is included because such natural oscillation or residual movement may be prevented or substantially reduced with the presence of a braking segment. If the haptic effect is being generated in a non-braking mode, the kick-in segment may be omitted, because the braking segment is no longer present to limit residual movement of the moveable component. In that situation, the kick-in segment may be omitted to prevent the moveable component from building up too much inertia, which may prolong unwanted residual movement. Thus, (i) when the selection or determination is made to generate the haptic effect in the braking mode, the control unit may be configured to include a kick-in segment in the driving segment of the driving pulse, and (ii) when the selection or determination is made to generate the haptic effect in the non-braking mode, the control unit is further configured to refrain from including any kick-in segment in the driving segment of the driving pulse. In another embodiment, a kick-in segment may be included in a driving segment of a driving pulse even if no braking segment is included in the driving pulse.

In an embodiment, a control unit may be configured to control aspects of haptic effect generation, including aspects other than braking, based on the energy conservation setting. For instance, the control unit may be configured to control at least one of an intensity (e.g., amplitude) of a driving segment of a driving pulse used to generate a haptic effect, and a duration of the driving segment of the driving pulse used to generate the haptic effect. For instance, different intensity levels (e.g., peak to peak amplitudes) or different pulse durations may be assigned to a normal mode, a medium energy saving mode, and an ultra-energy saving mode, respectively. In other words, energy conservation may be achieved by reducing an intensity of a driving pulse of a driving signal or reducing a duration of the driving pulse. In an embodiment, the adjusting of the intensity or duration of driving pulses may be independent of whether or not braking is used. In an embodiment, the adjusting of the intensity or duration may complement the use or omission of braking. For instance, if the control unit selects or determines to use a non-braking mode, it may control residual vibration by using a driving pulse with a reduced intensity or reduced duration. In an embodiment, the intensity of a driving segment of a driving pulse may be reduced by ramping it down with a nonzero slope. An un-ramped or flat version of a driving pulse is, e.g., a 5 V rectangular pulse. An embodiment of a ramp-down version of a pulse is a pulse which begins at 10 V and ramps down at a slope of, e.g. 0.2 V/msec to 5 V after 25 msec. In an embodiment, the intensity of a driving segment of a driving pulse may be reduced by limiting a maximum power (e.g., energy per unit of time) supplied to a haptic actuator.

In an embodiment, the control unit may be configured to generate a haptic effect to simulate a texture, and the control unit may be configured to control, based on the energy conservation setting, a complexity level of the texture to be simulated by the haptic effect. In some instances, to simulate a relatively complex texture, a haptic effect may need to be created by a sharp or crisp movement from an actuator. This may involve a need to use a kick-in segment to increase acceleration in the actuator and a braking segment to later stop movement in the actuator. By making a determination to instead simulate a less complex texture, the haptic-enabled device may avoid the need to use a kick-in segment and a braking segment.

In an embodiment, the control unit is configured to apply or communicate a drive signal, which includes a plurality of driving pulses, to a haptic actuator of a haptic-enabled device. In some instances, if the haptic-enabled device is in a braking mode, then the drive signal may be a first drive signal in which all driving pulses of the plurality of driving pulses may have a braking segment, as illustrated in FIGS. 4A and 4B. In some instances, if the haptic-enabled device is in a non-braking mode, the drive signal may be a second drive signal in which a braking segment is omitted by the control unit from all driving pulses of the plurality of driving pulses, as illustrated in FIGS. 5A and 5B. In other instances, if the haptic-enabled device is in a non-braking mode, the control unit may omit a braking segment from only some driving pulses of the plurality of driving pulses.

In an embodiment, the control unit is configured to control, based on the energy conservation setting, a total number of driving pulses of a driving signal that are applied to the haptic actuator in a predetermined unit of time. The unit of time may be, in this embodiment, a total duration of a driving signal (e.g., driving signal 400) for rendering a particular haptic effect. In this embodiment, if the energy conservation setting is in a normal mode, the control unit may be configured to generate or otherwise apply more driving pulses (e.g., 3 pulses that are 40 msec apart) in a unit of time allotted to the driving signal.

Figure 6A:
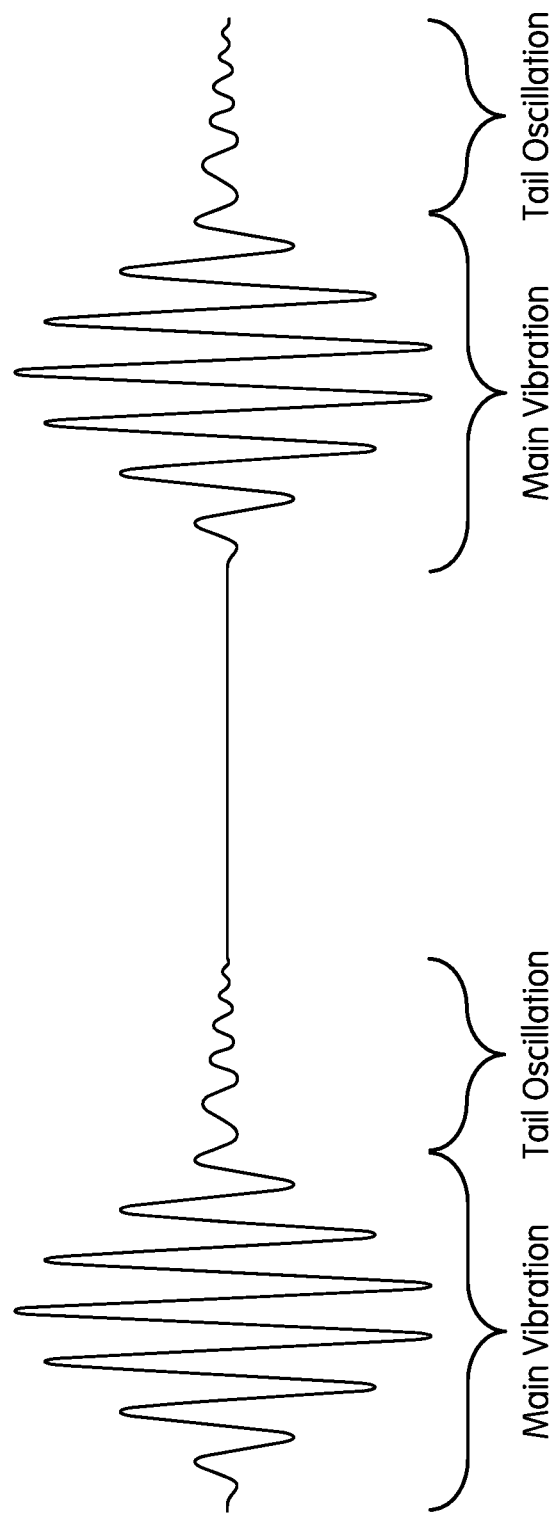
FIGS. 6A and 6B illustrate waveforms representing a haptic effect in a haptic-enabled device, according to an embodiment hereof.
Figure 6B:
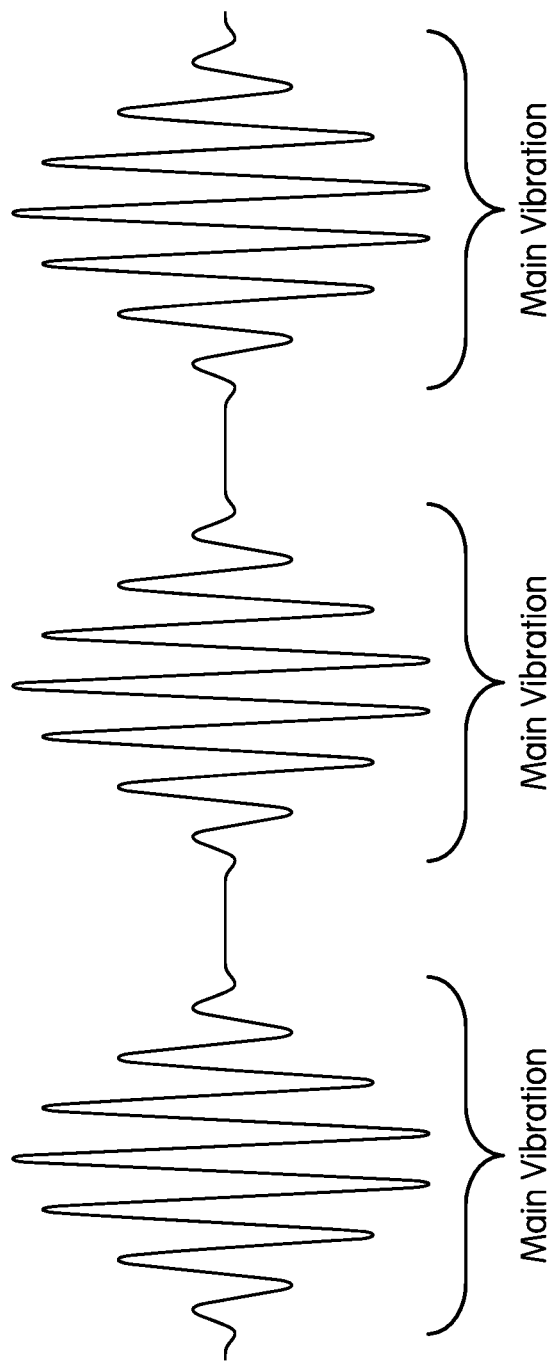

If the energy conservation setting is in an energy saving mode, the control unit may be configured to generate or otherwise apply fewer driving pulses (e.g., 2 pulses that are 80 msec apart) in the unit of time. Using fewer driving pulses in a unit of time may allow energy to be saved. This technique may similarly be independent of whether braking is used, or may complement the use of or omission of braking. More specifically, using fewer driving pulses may result in the pulses being spaced farther apart in time (e.g., 80 msec apart). Thus, there is more time for residual movement from one pulse to naturally decay before a subsequent pulse begins. In this scenario, the use of braking may be less necessary, and the driving pulses therein may omit braking segments, as illustrated in FIGS. 5A-5B. An example of a haptic effect that results from using fewer driving pulses is illustrated in FIG. 6A. FIG. 6A depicts a haptic effect which may include two vibratory pulses corresponding to each of two driving pulses. Each vibratory pulse shows a residual vibration (tail oscillation), due to the omission of a braking segment. Further, when the energy conservation setting indicates that energy does not need to be conserved, the haptic-enabled device may select a braking mode that uses braking segments in the driving pulses. By comparison, the use of more driving pulses in a driving signal, as illustrated in FIGS. 4A-4B, may cause the driving pulses to be spaced closer together in time. In this scenario, residual movement from each pulse may need to decay more quickly or be eliminated. Thus, a braking segment may be combined with the use of more driving pulses, as shown in FIGS. 4A-4B. An example of a haptic effect which results from such driving pulses is illustrated in FIG. 6B, which depicts three vibratory pulses. As depicted in FIG. 6B, each vibratory pulse may have substantially reduced or eliminated residual vibration due to the use of a braking segment.

In an embodiment, the control unit may control a frequency content of each driving pulse of the plurality of driving pulses of a drive signal based on the energy conservation setting. For instance, if the energy conservation setting is in an energy saving mode, the control unit may apply a driving pulse which includes a single frequency, such as a sinusoidal pulse at, e.g., 100 Hz. If the energy conservation setting is in a normal mode, the control unit may apply a driving pulse which includes multiple frequencies, such as a sum of a first sinusoidal pulse of 100 Hz and a second sinusoidal pulse of 200 Hz. This embodiment may be used with, e.g., a high-definition (HD) actuator. A HD actuator may be an actuator that has mechanical or other forms of dampening to reduce residual movement in the actuator, such that the actuator may be able to receive a strong driving segment from a driving pulse, and to control the residual movement in the actuator even without a braking segment. Thus, in one embodiment, the control unit may apply to the HD actuator a driving pulse which includes at least a resonant frequency of the HD actuator, or only the resonant frequency of the HD actuator. If the energy conservation setting is in a normal mode, the control unit may include one or more additional frequencies in the driving pulse.

In an embodiment in which a haptic-enabled device includes multiple haptic actuators, a control unit may be configured to select a haptic actuator from among the multiple haptic actuators to generate a haptic effect, where the selection is based on the energy conservation setting and energy usage of the haptic actuators. In this embodiment, the multiple haptic actuators may expend or require different amounts of energy to generate a haptic effect. A higher driving voltage may need to be applied to a particular actuator, e.g., an ERM actuator compared to a piezoelectric actuator, to achieve the same or comparable amounts of movement of their respective moveable components. Information regarding the energy usage of the haptic actuators may be stored in, e.g., an actuator profile (e.g., profile 114d) that describes energy usage of one or more haptic actuators. If the energy conservation setting is in an energy saving mode, the control unit may, for example, select a haptic actuator with the lowest energy usage.

In an embodiment, the energy conservation setting may affect how many haptic actuators are driven in response to an event. In a normal mode, a particular event in an application (e.g., a communication application or a game application) may trigger an output from multiple haptic actuators, which may each receive a driving signal. The output from the multiple haptic actuators may be considered one haptic effect, or a combination of multiple respective haptic effects. In an energy saving mode, the same event may trigger output from a fewer number of haptic actuators (e.g., only one actuator).

In an embodiment, if the energy conservation setting is in an energy saving mode, the control unit may be more selective in when to generate a haptic effect. In this embodiment, the control unit may select, based on the energy conservation setting, what events trigger a haptic effect. In some cases, this may be done on an application level. For instance, the control unit may be executing an application, such as a game application, and code in the application may select which events trigger a haptic effect based on the energy conservation setting. In an embodiment, an application profile (e.g., application profile 114b, which may be a game profile) may specify a priority for different events in the game or other application. If the energy conservation setting is in a normal mode, the control unit may be configured to recognize all of the events in the application profile as a trigger for a haptic effect. If the energy conservation setting is in an energy conservation mode, the control unit may be configured to recognize only high priority events as a trigger for a haptic effect, and to ignore all other (e.g., low priority) events.

In another example, the application may be a communication application, such as a social media or other communication application. In the example, the haptic-enabled device may be configured to receive communication associated with respective user identities (e.g., text messages from other users' devices, or social media posts associated with other users), and the communication may be processed as communication events in the communication application (e.g., receipt of a text message may be treated as a communication event, and notification of a social media post may be treated as another communication event). The energy conservation setting may affect which events in the social media or communication application triggers a haptic effect. When the energy conservation setting has a first value (e.g., normal mode), the control unit may be configured to recognize all communication events associated with any user identity to trigger the haptic effect. For instance, the arrival of a text message may be a communication event that triggers a haptic effect. When the energy conservation setting has a second value (e.g., energy saving mode), the control unit may be configured to recognize communication events associated with a determined set of one or more user identities to trigger the haptic effect and to ignore all other communication events for determining whether the haptic effect is triggered. For example, a user profile (e.g., profile 114c) stored on a haptic-enabled device may have user identities of social media friends of a user of the haptic-enabled device. The control unit may be configured to recognize a communication events (e.g., receipt of text messages) from any social media friend identified in the user profile to trigger a haptic effect, and to ignore all other text messages for purposes of determining whether to generate a haptic effect.

Figure 7:
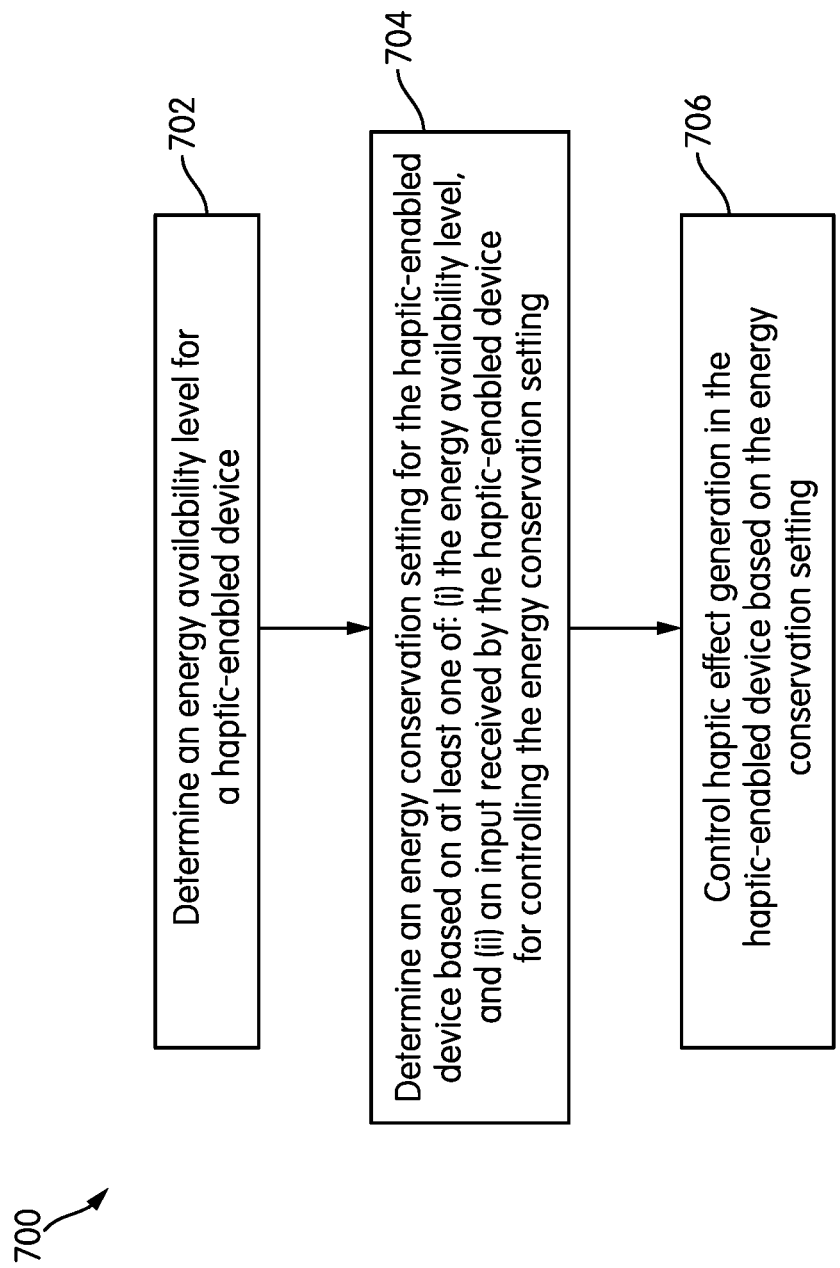
FIG. 7 is a flow diagram which presents steps of a method for controlling haptic effect generation, according to an embodiment hereof.

As discussed above, the energy conservation setting may be used to control the generation of a haptic effect, either independent of whether braking is used, or in combination with the usage or omission of braking. FIG. 7 provides a flow diagram of a method 700 for controlling the generation of a haptic effect, either independent of or based on the use or omission of braking. Method 700 may be executed by a haptic-enabled device having a haptic actuator configured to generate a haptic effect, an energy storage device configured to provide energy to the haptic actuator to generate the haptic effect, and a control unit communicatively coupled to the haptic actuator. In an embodiment, method 700 begins at step 702, in which a control unit (e.g., unit 102) of a haptic enabled device determines an energy availability level for the haptic-enabled device. The energy availability level may indicate a level of energy available to the haptic-enabled device in an upcoming time period. In an embodiment, determining the energy availability level may be based on at least one of (i) an energy level of the energy storage device or an energy usage rate thereof, and (ii) an estimated availability level of any external energy source for providing energy to the haptic-enabled device in the upcoming time period.

As discussed above, the determination of the estimated availability level of an external energy source may be based on, e.g., (i) a geographic location of the haptic-enabled device, (ii) a moving speed of the haptic-enabled device, and (iii) an amount of time that has elapsed since the energy storage device of the haptic-enabled device was most recently charged. The geographic location of the haptic-enabled device may indicate, e.g., whether the device is located indoors or outdoors, or whether the device is at a home location or a work location. If the device is located indoors, and especially if the device is at a home location, the estimated availability level of an external energy source may be high. If the device is located outdoors, the estimated availability level of an external energy source may be low.

In an embodiment, the moving speed of a haptic-enabled device may provide an indication of whether a user of the device is traveling or in transit, during which there may be only limited access to a charging source. In this embodiment, if the moving speed is greater than an average walking speed (e.g., 3 miles per hour) or other threshold, the estimated availability level of an external energy source may be low.

In an embodiment, the amount of time since an energy storage device was most recently charged may be compared against any pattern of charging times for a haptic-enabled device. For example, a user may charge a battery of a haptic-enabled device on a daily basis, and such information regarding the pattern of charging times (e.g., 9 PM on Wednesday, 9:10 PM on Thursday, etc.) may be stored in an energy storage device management profile (e.g., profile 114a). A control unit may access the energy storage device management profile to determine whether the amount of time since the haptic-enabled device was most recently charged (e.g., 26 hours) is more than any pattern of how often the haptic-enabled device is charged (e.g., about every 24 hours). In this example, if more than 24 hours has elapsed since the battery was most recently charged, there may be a greater likelihood that a user of the haptic-enabled device does not have access to an external energy source. In that scenario, the control unit may lower an estimated availability level of an external energy source.

Returning to FIG. 7, step 702 may be followed by step 704, in which the control unit determines an energy conservation setting for the haptic-enabled device based on at least one of: (i) the energy availability level, and (ii) an input received by the haptic-enabled device for controlling the energy conservation setting. Examples of how the energy conservation setting is determined are provided above.

In step 706, the control unit may be configured to control haptic effect generation in the haptic-enabled device based on the energy conservation setting. As discussed above, controlling the generating of a haptic effect may include controlling at least one of: (i) availability of the haptic effect generally, or availability of the haptic effect in the upcoming time period (e.g., whether in the upcoming time period a haptic effect is able to be triggered by a particular event), (ii) an intensity of a driving segment of a driving pulse used to generate the haptic effect, and (iii) a duration of the driving segment of the driving pulse used to generate the haptic effect.

Other embodiments of controlling the generating of a haptic effect include reducing a complexity of the texture to be simulated by the haptic effect (if the haptic effect is used to simulate a texture), selecting from among multiple haptic actuators a particular haptic actuator that has low energy usage, or reducing the number of events which are recognized to trigger a haptic effect. For instance, the events may be communication events (e.g., receipt of text messages) from various user identities. When the energy conservation setting has a first value (e.g., normal mode), the control unit may be configured to recognize all communication events associated with any user identity to trigger a haptic effect. When the energy conservation setting has a second value (e.g., energy saving mode), the control unit may be configured to recognize communication events associated with a set of preferred user identities (e.g., social media friends) to trigger a haptic effect, and to ignore all other communication events for purposes of determining whether a haptic effect has been triggered.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment.

What is claimed is:

1. A haptic-enabled device, comprising:
a haptic actuator configured to generate a haptic effect;
an energy storage device configured to provide energy to the haptic actuator to generate the haptic effect; and
a control unit communicatively coupled to the haptic actuator and configured,
to determine an energy availability level for the haptic-enabled device, wherein the energy availability level indicates a level of energy available to the haptic-enabled device in an upcoming time period, the upcoming time period being calculated by the control unit or being predetermined, wherein the determination is based on an energy level of the energy storage device or an energy usage rate thereof,
to determine an energy conservation setting for the haptic-enabled device based on at least one of (i) the energy availability level, and (ii) an input received by the haptic-enabled device for controlling the energy conservation setting, and
to determine, based on the energy conservation setting, whether to generate the haptic effect in a braking mode or in a non-braking mode, wherein
in response to a determination to generate the haptic effect in the braking mode, the control unit communicates a first drive signal to the haptic actuator, the first drive signal including a driving pulse having a driving segment followed by a braking segment to reduce the haptic effect, to generate the haptic effect in the braking mode, and
in response to a determination to generate the haptic effect in the non-braking mode, the control unit communicates a second drive signal to the haptic actuator, the second drive signal including a driving pulse having only a driving segment followed by a zero-magnitude signal to reduce the haptic effect without a braking segment, to generate the haptic effect in the non-braking mode.

2. The haptic-enabled device of claim 1, wherein when the determination is made to generate the haptic effect in the braking mode, the control unit is further configured to include a kick-in segment in the driving segment of the driving pulse of the first drive signal, wherein the kick-in segment is a pulse segment that is at a start of the driving segment and has a higher amplitude than a remaining part of the driving segment.

3. The haptic-enabled device of claim 1, wherein when the determination is made to generate the haptic effect in the non-braking mode, the control unit is further configured to refrain from including any kick-in segment in the driving segment of the driving pulse.

4. The haptic-enabled device of claim 1, wherein the control unit is further configured to control, based on the energy conservation setting, at least one of (i) an intensity of a driving segment of a driving pulse of the first or second drive signal used to generate the haptic effect, and (ii) a duration of a driving segment of a driving pulse of the first or second drive signal used to generate the haptic effect.

5. The haptic-enabled device of claim 1, wherein the control unit is configured to generate the haptic effect to simulate a texture, wherein the control unit is configured to control, based on the energy conservation setting, a complexity level of the texture to be simulated by the haptic effect.

6. The haptic-enabled device of claim 1, wherein the control unit is configured to apply, in the respective first or second drive signal, a plurality of driving pulses to the haptic actuator, wherein the control unit is configured to control, based on the energy conservation setting, a total number of driving pulses to apply to the haptic actuator in a predetermined unit of time.

7. The haptic-enabled device of claim 1, wherein the haptic actuator is one of a plurality of haptic actuators of the haptic-enabled device, and wherein the control unit is further configured to select the haptic actuator from among the plurality of haptic actuators to generate the haptic effect, wherein the selection is based on the energy conservation setting.

8. The haptic-enabled device of claim 1, wherein the haptic effect is generated in response to an event recognized by the control unit to trigger the haptic effect, wherein the control unit is configured to control, based on the energy conservation setting, which events trigger the haptic effect.

9. The haptic-enabled device of claim 8, wherein the haptic-enabled device is configured to receive communication associated with respective user identities, and is configured to execute a communication application that processes the communication as communication events, and when the energy conservation setting has a first value, the control unit is configured to recognize all communication events associated with any user identity to trigger the haptic effect, and when the energy conservation setting has a second value, the control unit is configured to recognize communication events associated with a determined set of one or more user identities to trigger the haptic effect and to ignore all other communication events for determining whether to trigger the haptic effect.

10. The haptic-enabled device of claim 8, wherein the haptic-enabled device is configured to execute a game application, and when the energy conservation setting has a first value, the control unit is configured to recognize a first event and a second event in the game application to trigger the haptic effect, and when the energy conservation setting has a second value, the control unit is configured to recognize the first event to trigger the haptic effect and to ignore the second event for determining whether to trigger the haptic effect, wherein the first event is associated with a higher priority level than the second event in a game application profile stored on the haptic-enabled device.

11. The haptic-enabled device of claim 1, wherein the control unit is configured to determine the energy availability level further based on an estimated availability level of any external energy source for providing energy to the energy storage device of the haptic-enabled device in the upcoming time period.

12. The haptic-enabled device of claim 11, wherein the control unit is configured to determine the estimated availability level of any external energy source based on at least one of (i) a geographic location of the haptic-enabled device, (ii) a moving speed of the haptic-enabled device, and (iii) an amount of time that has elapsed since the energy storage device of the haptic-enabled device was most recently charged.

13. The haptic-enabled device of claim 12, wherein the control unit is configured to determine, based on the geographic location of the haptic-enabled device, whether the haptic-enabled device is at an outdoor location or an indoor location, and is configured to determine the estimated availability level of any external energy source for providing energy to the energy storage device of the haptic-enabled device based on whether the haptic-enabled device is at the outdoor location or at the indoor location.

14. The haptic-enabled device of claim 12, wherein the control unit is configured to determine, based on the geographic location of the haptic-enabled device, whether the haptic-enabled device is at a home location or a work location, and is configured to determine the estimated availability of any external energy source for providing energy to the energy storage device of the haptic-enabled device based on whether the haptic-enabled device is at the home location or at the work location.

15. The haptic-enabled device of claim 1, wherein the control unit is configured to generate the haptic effect in the braking mode when the energy conservation setting indicates a normal mode, and to generate the haptic effect in the non-braking mode when the energy conservation setting indicates an energy conservation mode.

16. A haptic-enabled device, comprising:
a haptic actuator configured to generate a haptic effect;
an energy storage device configured to provide energy to the haptic actuator to generate the haptic effect; and
a control unit communicatively coupled to the haptic actuator and configured
to determine an energy availability level for the haptic-enabled device, wherein the energy availability level indicates a level of energy available to the haptic-enabled device in an upcoming time period, and is based on at least one of (i) an energy level of the energy storage device or an energy usage rate thereof, and (ii) an estimated availability level of any external energy source for providing energy to the haptic-enabled device in the upcoming time period, the upcoming time period being calculated by the control unit or being predetermined,
to determine an energy conservation setting for the haptic-enabled device based on at least one of (i) the energy availability level, and (ii) an input received by the haptic-enabled device for controlling the energy conservation setting, and
to control haptic effect generation in the haptic-enabled device based on the energy conservation setting by controlling, based on the energy conservation setting, which events trigger the haptic effect, wherein all types of events trigger the haptic effect when the energy conservation setting indicates a normal mode and one or more particular types of events trigger the haptic effect when the energy conservation setting indicates an energy conservation mode, the one or more particular types of events being a subset of the all types of events.

17. The haptic-enabled device of claim 16, wherein the control unit is configured to determine the estimated availability level of any external energy source for providing energy to the haptic-enabled device based on at least one of (i) a geographic location of the haptic-enabled device, (ii) a moving speed of the haptic-enabled device, and (iii) an amount of time that has elapsed since the energy storage device of the haptic-enabled device was most recently charged.

18. The haptic-enabled device of claim 17, wherein the control unit is configured to determine, based on the geographic location of the haptic-enabled device, whether the haptic-enabled device is at an outdoor location or an indoor location, and is configured to determine the estimated availability level of any external energy source based on whether the haptic-enabled device is at the outdoor location or at the indoor location.

19. The haptic-enabled device of claim 17, wherein the control unit is configured to determine, based on the geographic location of the haptic-enabled device, whether the haptic-enabled device is at a home location or a work location, and is configured to determine the estimated availability of any external energy source based on whether the haptic-enabled device is at the home location or at the work location.

20. The haptic-enabled device of claim 16, wherein the control unit is configured to control haptic effect generation in the haptic-enabled device by controlling, based on the energy conservation setting, at least one of (i) availability of the haptic effect in the upcoming time period, (ii) an intensity of a driving segment of a driving pulse of a drive signal used to generate the haptic effect, and (iii) a duration of the driving segment of the driving pulse of the drive signal used to generate the haptic effect.

21. The haptic-enabled device of claim 16, wherein the haptic actuator is one of a plurality of haptic actuators in the haptic-enabled device, wherein the haptic-enabled device is configured to store a plurality of actuator profiles that each indicates energy usage behavior of a respective haptic actuator of the plurality of haptic actuators, and wherein the control unit is configured to control haptic effect generation by selecting, based on the energy conservation setting and the actuator profiles, which one of the plurality of haptic actuators is to be used to generate the haptic effect.

* * * * *